United States Patent
Shibata

(10) Patent No.: US 9,609,690 B2
(45) Date of Patent: Mar. 28, 2017

(54) COMMUNICATION DEVICE

(71) Applicant: Hiroshi Shibata, Obu (JP)

(72) Inventor: Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/208,220

(22) Filed: Mar. 13, 2014

(65) Prior Publication Data

US 2014/0293980 A1 Oct. 2, 2014

(30) Foreign Application Priority Data

Mar. 28, 2013 (JP) ................................. 2013-068624

(51) Int. Cl.
*H04W 4/00* (2009.01)
*H04W 88/06* (2009.01)
(Continued)

(52) U.S. Cl.
CPC ........ *H04W 88/06* (2013.01); *H04N 1/00342* (2013.01); *H04N 1/32797* (2013.01); *H04W 4/008* (2013.01); *H04W 76/023* (2013.01); *H04W 76/026* (2013.01); *H04L 69/18* (2013.01); *H04W 84/18* (2013.01)

(58) Field of Classification Search
None
See application file for complete search history.

(56) References Cited

U.S. PATENT DOCUMENTS

| 7,209,706 B2 | 4/2007 | Fujii et al. |
| 2003/0007606 A1 | 1/2003 | Suder et al. |

(Continued)

FOREIGN PATENT DOCUMENTS

| CN | 101253469 A | 8/2008 |
| CN | 101790183 A | 7/2010 |

(Continued)

OTHER PUBLICATIONS

Extended European Search Report issued in European Application No. 13161732.6 dated Jul. 23, 2013.

(Continued)

*Primary Examiner* — Phirin Sam
(74) *Attorney, Agent, or Firm* — Banner & Witcoff, Ltd.

(57) ABSTRACT

A communication device may receive first information from a terminal device in a case where a first communication link is established via a first type of interface between the communication device and the terminal device. The communication device may determine whether a communication via a second type of interface between the communication device and the terminal device is performable, establish a second communication link via the first type of interface between the communication device and the terminal device, and perform a two-way communication of second information with the terminal device by using the second communication link in a case where it is determined that the communication via the second type of interface is performable. The communication device may not perform the two-way communication of the second information with the terminal device in a case where it is determined that the communication is not performable.

15 Claims, 11 Drawing Sheets

(51) Int. Cl.
*H04W 76/02* (2009.01)
*H04N 1/00* (2006.01)
*H04N 1/327* (2006.01)
*H04L 29/06* (2006.01)
*H04W 84/18* (2009.01)

(56) References Cited

U.S. PATENT DOCUMENTS

| | | |
|---|---|---|
| 2004/0116074 A1 | 6/2004 | Fujii et al. |
| 2004/0192264 A1 | 9/2004 | Liu et al. |
| 2005/0077356 A1 | 4/2005 | Takayama et al. |
| 2005/0088709 A1 | 4/2005 | Kizaki et al. |
| 2006/0101280 A1 | 5/2006 | Sakai |
| 2006/0126118 A1 | 6/2006 | Nagata |
| 2007/0190937 A1 | 8/2007 | Takayama |
| 2007/0190939 A1 | 8/2007 | Abel |
| 2007/0230332 A1 | 10/2007 | Fukasawa |
| 2008/0052710 A1 | 2/2008 | Iwai et al. |
| 2008/0084578 A1 | 4/2008 | Walker et al. |
| 2008/0117847 A1 | 5/2008 | Hamada |
| 2008/0218810 A1 | 9/2008 | Itoh |
| 2008/0222711 A1 | 9/2008 | Michaelis |
| 2008/0231900 A1 | 9/2008 | Abe |
| 2009/0023476 A1 | 1/2009 | Saarisalo et al. |
| 2009/0024768 A1 | 1/2009 | Maruyama et al. |
| 2009/0036056 A1 | 2/2009 | Oshima et al. |
| 2009/0052348 A1 | 2/2009 | Kato et al. |
| 2009/0066998 A1 | 3/2009 | Kato |
| 2009/0073482 A1 | 3/2009 | Tsuchiya |
| 2009/0103124 A1 | 4/2009 | Kimura et al. |
| 2009/0147803 A1 | 6/2009 | Takayama |
| 2009/0193500 A1* | 7/2009 | Griffin et al. ............... 726/2 |
| 2009/0271519 A1 | 10/2009 | Helvick |
| 2010/0050189 A1* | 2/2010 | Sng .................. G06F 13/102 719/321 |
| 2010/0058359 A1* | 3/2010 | Ferlitsch ........... G06F 13/102 719/321 |
| 2010/0069008 A1 | 3/2010 | Oshima et al. |
| 2010/0077031 A1 | 3/2010 | Yoneda et al. |
| 2010/0078471 A1 | 4/2010 | Lin et al. |
| 2010/0078472 A1* | 4/2010 | Lin et al. .................. 235/379 |
| 2010/0082485 A1* | 4/2010 | Lin et al. ................... 705/44 |
| 2010/0130127 A1 | 5/2010 | Takayama |
| 2010/0151790 A1 | 6/2010 | Hoeksel et al. |
| 2010/0188695 A1 | 7/2010 | Okigami |
| 2010/0207735 A1 | 8/2010 | Kim |
| 2010/0207742 A1 | 8/2010 | Buhot et al. |
| 2010/0311330 A1 | 12/2010 | Aibara et al. |
| 2011/0002005 A1* | 1/2011 | Ashmore ........... H04N 1/00307 358/1.15 |
| 2011/0026068 A1 | 2/2011 | Yoshida |
| 2011/0028091 A1 | 2/2011 | Higgins et al. |
| 2011/0065385 A1 | 3/2011 | Geslin et al. |
| 2011/0090830 A1 | 4/2011 | Churei |
| 2011/0177780 A1 | 7/2011 | Sato et al. |
| 2011/0210618 A1 | 9/2011 | Takasu |
| 2011/0258322 A1 | 10/2011 | Luzzatti et al. |
| 2011/0292445 A1 | 12/2011 | Kato |
| 2012/0034868 A1 | 2/2012 | Fine et al. |
| 2012/0069772 A1 | 3/2012 | Byrne et al. |
| 2012/0100803 A1 | 4/2012 | Suumaki et al. |
| 2012/0101944 A1* | 4/2012 | Lin et al. ................... 705/44 |
| 2012/0135681 A1 | 5/2012 | Adams et al. |
| 2012/0166338 A1 | 6/2012 | Agnelli et al. |
| 2012/0297048 A1* | 11/2012 | Hsu .................. H04L 12/2856 709/223 |
| 2012/0329390 A1 | 12/2012 | Kim |
| 2013/0009752 A1* | 1/2013 | Finkenzeller et al. ...... 340/10.1 |
| 2013/0040565 A1 | 2/2013 | Suzuki |
| 2013/0077124 A1* | 3/2013 | Vojak .................. G06F 3/1292 358/1.14 |
| 2013/0080276 A1 | 3/2013 | Granbery |
| 2013/0083358 A1 | 4/2013 | Suzuki |
| 2013/0196595 A1 | 8/2013 | Byrne et al. |
| 2013/0204726 A1 | 8/2013 | Cruttenden et al. |
| 2013/0215467 A1 | 8/2013 | Fein et al. |
| 2013/0229684 A1 | 9/2013 | Yasuzaki |
| 2013/0244578 A1 | 9/2013 | Bacioccola |
| 2013/0258390 A1 | 10/2013 | Suzuki et al. |
| 2013/0260683 A1 | 10/2013 | Suzuki et al. |
| 2013/0260684 A1 | 10/2013 | Suzuki et al. |
| 2013/0311313 A1* | 11/2013 | Laracey ..................... 705/16 |
| 2014/0004793 A1 | 1/2014 | Bandyopadhyay et al. |
| 2014/0038517 A1 | 2/2014 | Asakura |
| 2014/0038518 A1 | 2/2014 | Asakura |
| 2014/0038519 A1 | 2/2014 | Asakura |
| 2014/0047038 A1* | 2/2014 | Piratla ............... H04N 1/00106 709/206 |
| 2014/0063537 A1 | 3/2014 | Nishikawa et al. |
| 2014/0104635 A1* | 4/2014 | Nishikawa .................. 358/1.14 |
| 2014/0219453 A1 | 8/2014 | Neafsey et al. |
| 2014/0256251 A1* | 9/2014 | Caceres et al. .............. 455/41.1 |
| 2014/0293980 A1 | 10/2014 | Shibata |
| 2014/0304596 A1 | 10/2014 | Chandran et al. |
| 2015/0093992 A1 | 4/2015 | Tanaka |
| 2015/0126115 A1* | 5/2015 | Yun et al. ................... 455/41.1 |
| 2015/0205550 A1* | 7/2015 | Lee ..................... G06F 3/1204 358/1.15 |
| 2015/0208245 A1* | 7/2015 | Robinton et al. ..... H04W 12/10 |
| 2015/0213436 A1* | 7/2015 | Griffin et al. ........ G06Q 20/3278 |
| 2015/0220290 A1* | 8/2015 | Park ..................... G06F 3/1296 358/1.13 |
| 2015/0270912 A1* | 9/2015 | Dhayni et al. ......... H04B 17/20 |
| 2015/0317116 A1 | 11/2015 | Suzuki et al. |
| 2015/0327172 A1 | 11/2015 | Kusakabe |
| 2015/0350905 A1 | 12/2015 | Suzuki |

FOREIGN PATENT DOCUMENTS

| | | |
|---|---|---|
| EP | 2296292 A1 | 3/2011 |
| EP | 2645265 A2 | 10/2013 |
| JP | H11-154061 A | 6/1999 |
| JP | 2000-228666 A | 8/2000 |
| JP | 2004-200840 A | 7/2004 |
| JP | 2007-166538 A | 6/2007 |
| JP | 2009-037566 A | 2/2009 |
| JP | 2009-135865 A | 6/2009 |
| JP | 2011-044092 A | 3/2011 |
| JP | 2011-146991 A | 7/2011 |
| JP | 2013187565 A | 9/2013 |
| JP | 2013-214139 A | 10/2013 |
| JP | 2013214804 A | 10/2013 |
| WO | 2005/017738 A1 | 2/2005 |

OTHER PUBLICATIONS

"Near Field Communication White Paper", Internet Citation; Feb. 12, 2004; URL:http://www.ecma-international.org/activities/Communications/2004tg19-001.pdf.
Sep. 4, 2014—(US) Final Office Action—U.S. Appl. No. 13/834,423.
Nosowitz, D., "Everything You Need to Know about Near Field Communication," Popular Science, posted Mar. 1, 2011.
Oct. 20, 2014—(US) Notice of Allowance—U.S. Appl. No. 13/833,236.
Dec. 12, 2014—(US) Notice of Allowance—U.S. Appl. No. 13/834,423.
Information Technology—Telecommunications and information exchange between systems—Near Field Communication Interface and Protocol-2 (NFCIP-2), ISO/IEC 21481, Second edition, Jul. 1, 2012.
Information Technology—Telecommunications and information exchange between systems—Near Field Communication—Interface and Protocol (NFCIP-1), ISO/IEC 18092, Second edition, Mar. 15, 2013.
Mar. 13, 2014—U.S. Appl. No. 14/208,220 as filed.
Mar. 26, 2015—(US) Co-Pending U.S. Appl. No. 14/669,553.
Wi-Fi Peer-to-Peer (P2P) Technical Specification Version 1.1 2010, pp. 1-159.

(56) References Cited

OTHER PUBLICATIONS

European Search Report issued in corresponding European Application No. 13179289.7 mailed Jan. 17, 2014.
Smart Cards; UICC-CLF interface; Host Controller Interface P2P LNC Protocol,Vo.1.0, Jan. 11, 2008, pp. 1-33.
Mar. 31, 2015—(US) Notice of Allowance—U.S. Appl. No. 13/834,423.
Mar. 6, 2015—(CN) Notification of First Office Action—App 201310097370.7.
Apr. 15, 2015—(US) Non-Final Office Action—U.S. Appl. No. 13/959,786.
European Search Report from European Patent Application No. 13161732.6-1502 dated Jul. 23, 2013.
Anonymus,:"Near Field Communication White Paper", Feb. 12, 2004, URL:http://www.ecma-international.org/activities/Communications/2004tg19-001.pdf [retrieved on Mar. 6, 2006].
Requirement for Election issued in U.S. Appl. No. 13/834,423 mailed Feb. 24, 2014.
Non-Final Office Action received in corresponding U.S. Appl. No. 13/834,423 mailed May 9, 2014.
Oct. 27, 2014—(EP) Office Action—App 13159607.
Sep. 9, 2014 U.S. Appl. No. 14/498,213 as filed.
Oct. 8, 2015—(EP) Extended European Search Report—App 15169695.2.
Oct. 2, 2015—(US)—Final Office Action—U.S. Appl. No. 13/959,786.
Oct. 9, 2015—(US) Non-Final Office Action—U.S. Appl. No. 14/706,368.
Aug. 31, 2011—NFC Forum, Simple NDEF Exchange Protocol Technical Specification, NFC Forum, SNEP 1.0, NFCForum-TS-SNEP_1.0.
Dec. 22, 2015—(JP) Notification of Reasons for Rejection—App 2012-082818—Eng Tran.
Dec. 22, 2015—(CN) Notification of First Office action—App 201310339554.X—Eng Tran.
Feb. 17, 2016—(US)—Final Office Action—U.S. Appl. No. 14/706,368.
Jan. 17, 2014—(EP) Extended Search Report—App 13179157.6.
Aug. 31, 2011—"Simple NDEF Exchange Protocol"—Technical Specification, SNEP 1.0, pp. 1-20.
Feb. 13, 2015—(US) Non-Final Office Action—U.S. Appl. No. 13/957,479.
Jan. 17, 2014—(EP) Extended Search Report—13179154.3.
Feb. 12, 2015—(US) Non-Final Office Action—U.S. Appl. No. 13/957,490.
Nov. 17, 2010—"NFC Digital Protocol," NFCForum-TS-DigitalProtocol-1.0.
Jul. 13, 2015—(US) Final Office Action—U.S. Appl. No. 13/957,479.
Jul. 16, 2015—(US) Final Office Action—U.S. Appl. No. 13/957,490.
Jul. 16, 2015—(US) Final Office Action—U.S. Appl. No. 13/933,419.
Aug. 5, 2014—(US) Non-Final Office Action—U.S. Appl. No. 13/933,419.
May 22, 2015—(US) Non-Final Office Action—U.S. Appl. No. 13/834,434.
Mar. 15, 2013—(US) Co-Pending U.S. Appl. No. 13/834,434.
Sep. 23, 2013—(EP) Search Report—App 13174778.4.
Nov. 26, 2014—(US) Notice of Allowance—U.S. Appl. No. 13/933,419.
Aug. 31, 2015—(US) Non-Final Office Action—U.S. Appl. No. 14/663,923.
Dec. 17, 2015—(US) Notice of Allowance—U.S. Appl. No. 13/957,479.
Oct. 14, 2015—(EP) Office Action—App 13179157.6.
Jul. 4, 2012—Jara, Antonio et al., "Interaction of patients with breathing problems through NFC in Ambient Assisted Living environments," 2012 Sixth International Conference on Innovative Mobile and Internet Services in Ubiquitous Computing, pp. 892-897, XP032234827. DOI: 10.1109/IMIS.2012.150 ISBN: 978-1-4673-1328-5.
May 14, 2012—Monteiro, David et al., "A Secure NFC Application for Credit Transfer Amoung Mobile Phones," 2012 International Conference on Computer Information and Telecommunication Systems (CITS), IEEE, pp. 1-5, XP032188431, DOI: 10.1109/CITS.2012.6220369 ISBN: 978-1-4673-1549-4.
Mar. 8, 2016—(JP) Notification of Reasons for Rejection—App 2012-173269.
Jan. 25, 2016—(US) Non-Final Office Action—U.S. Appl. No. 13/957,490.
Apr. 26, 2016—(US) Non-Final Office Action—U.S. Appl. No. 13/959,786.
May 6, 2016—(US) Non-Final Office Action—U.S. Appl. No. 13/957,479.
May 11, 2016—(US) Notice of Allowance—U.S. Appl. No. 14/706,368.
Mar. 1, 2016—(JP) Notice of Reasons for Rejection—App 2012-193091—Eng Tran.
Jul. 2, 2013—(US) Co-pending U.S. Appl. No. 13/933,419
Jan. 12, 2016—(JP) Notification of Reasons for Rejection—App 2012-082819—Eng Tran.
Feb. 25, 2016—(US) Final Office Action—U.S. Appl. No. 13/834,434.
Jan. 29, 2016—(US) Notice of Allowance—U.S. Appl. No. 14/633,923.
Jan. 12, 2016—(JP) Notification of Reasons for Rejection—App 2012-082819.
Jun. 20, 2016—(US) Final Office Action—U.S. Appl. No. 13/957,490.
May 17, 2016—(JP) Notification of Reasons for Rejection—App 2012-082818—Eng Trans.
May 3, 2016—(CN) Office Action—App 201310084346.X—Eng Tran.
Jun. 22, 2016—(US) Notice of Allowance—U.S. Appl. No. 14/706,368.
Sep. 6, 2016—(US) Non-Final Office Action—U.S. Appl. No. 15/132,432.
Aug. 31, 2011—NFC Forum Simlple NDEF Exchange Protocol.
U.S. Appl. No. 61/601,496, filed Feb. 21, 2012, Specification.
U.S. Appl. No. 61/601,496, filed Feb. 21, 2012, Drawings.
Jul. 7, 2010—NFC Forum Connection Handover Technical Specification 1.2.
Aug. 11, 2016—(US) Notice of Allowance—U.S. Appl. No. 13/959,786.
Aug. 23, 2016—(US) Non-Final Office Action—U.S. Appl. No. 14/498,213.
Aug. 25, 2016—(US) Non-Final Office Action—U.S. Appl. No. 13/834,434.
Aug. 9, 2016—(US) Notice of Allowance—U.S. Appl. No. 13/957,479.
Nov. 3, 2016—(US) Non-Final Office Action—U.S. Appl. No. 15/162,995.
Nov. 2, 2016—(US) Non-Final Office Action—U.S. Appl. No. 14/669,553.
Dec. 6, 2016—(US) Notice of Allowance—U.S. Appl. No. 14/706,368.
Dec. 2, 2016—(US) Notice of Allowance—U.S. Appl. No. 13/957,479.
Dec. 22, 2016—(US) Notice of Allowance—U.S. Appl. No. 13/957,490.
Jan. 10, 2017—(US) Notice of Allowance—U.S. Appl. No. 13/834,434.
Nov. 25, 2016—(CN) Office Action—App 201310084346.X—Eng Tran.

* cited by examiner

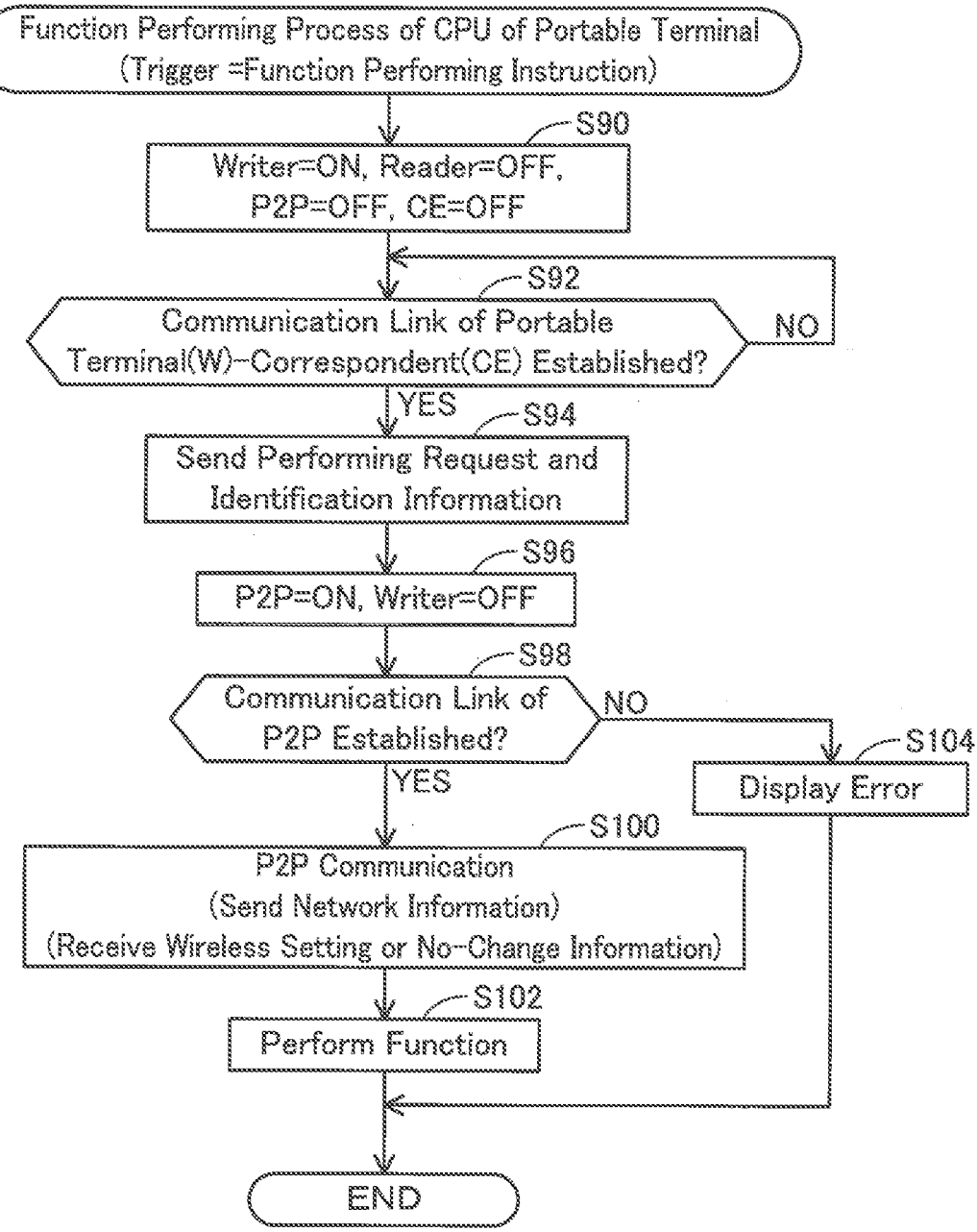

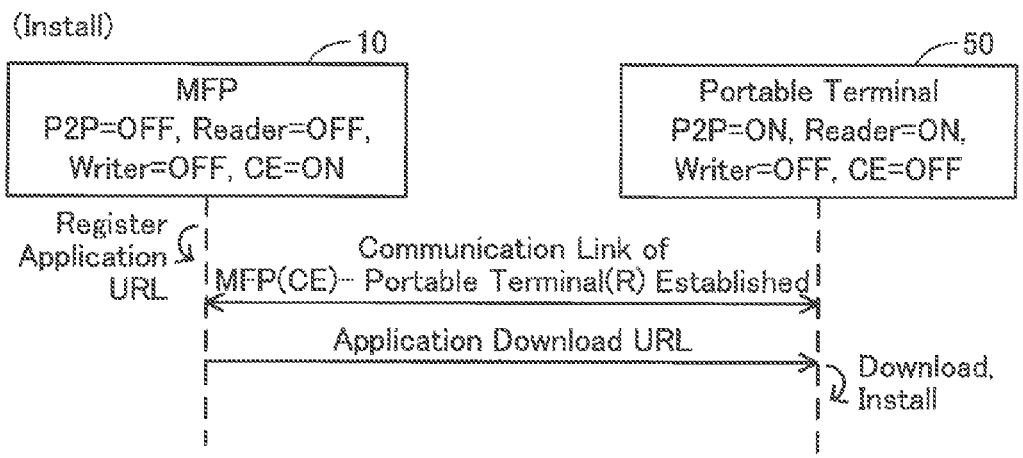
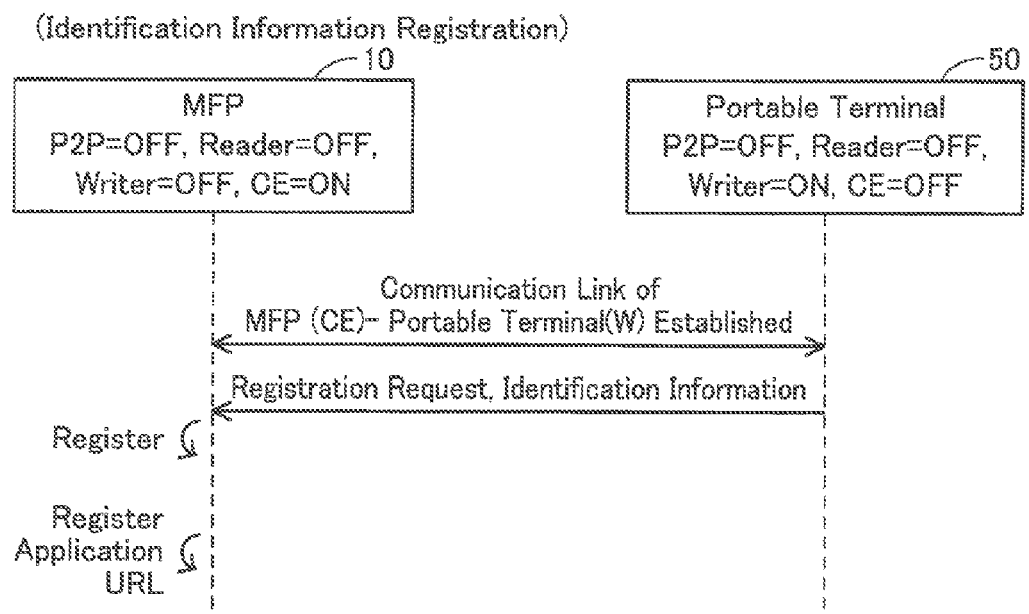

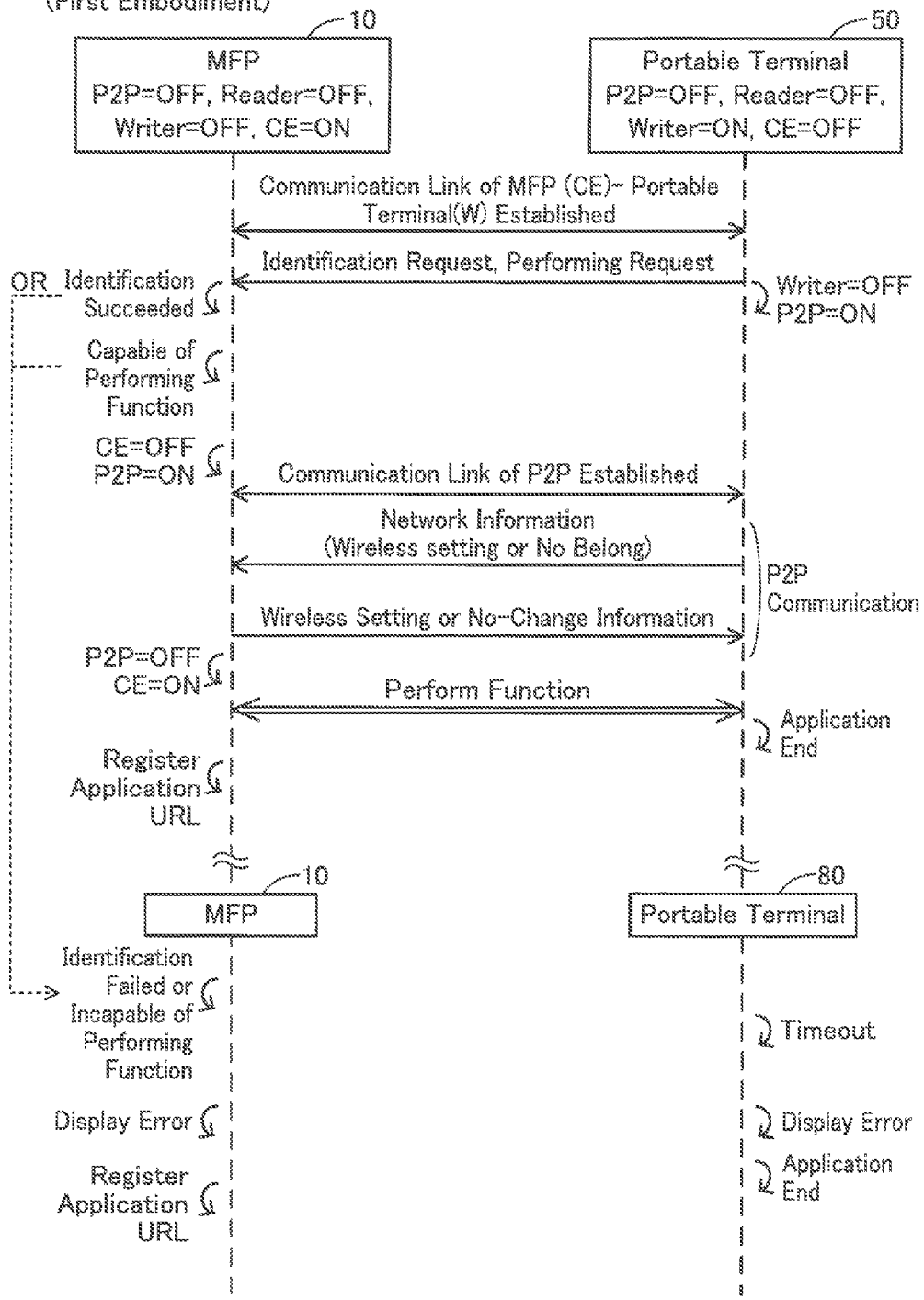

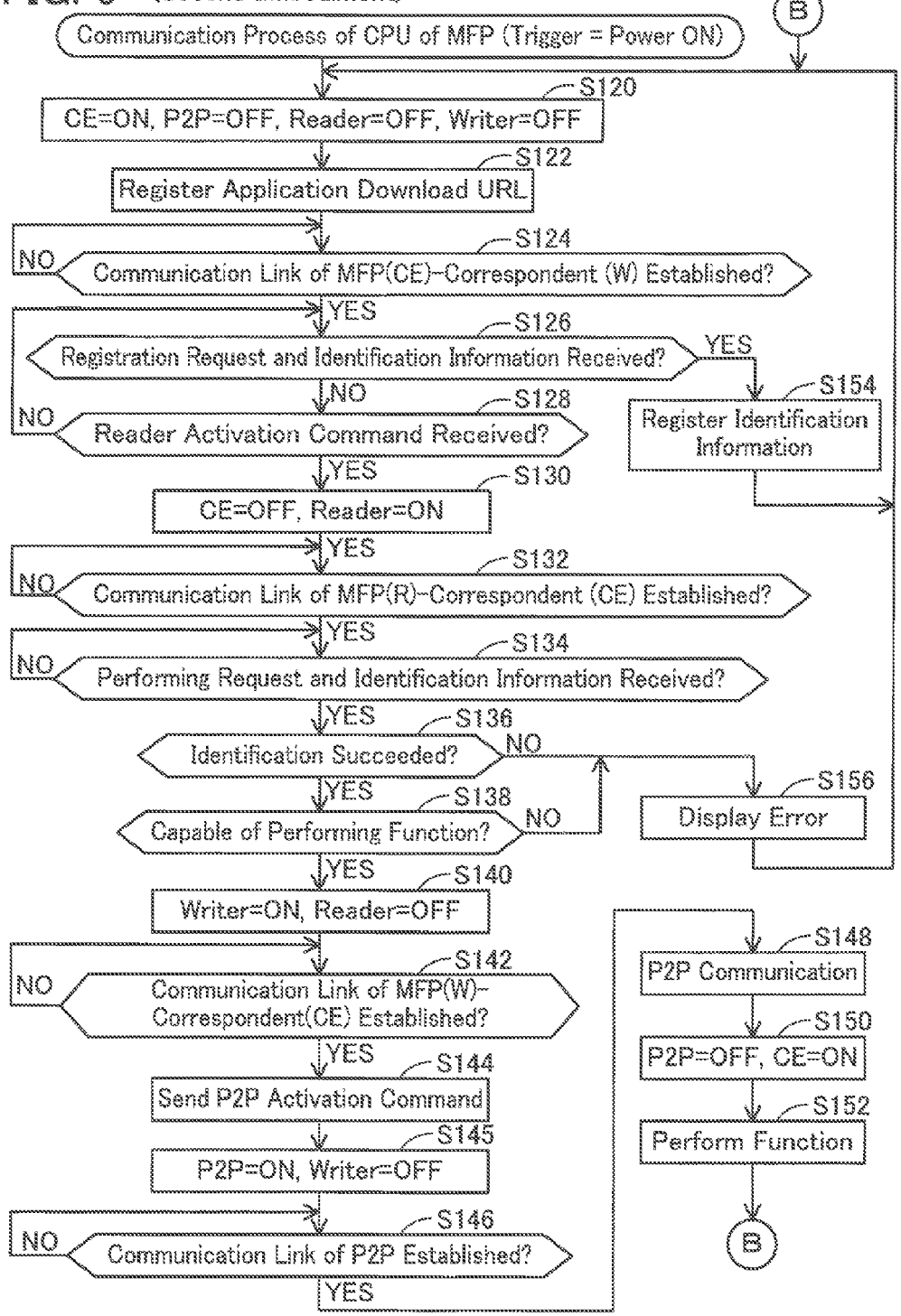

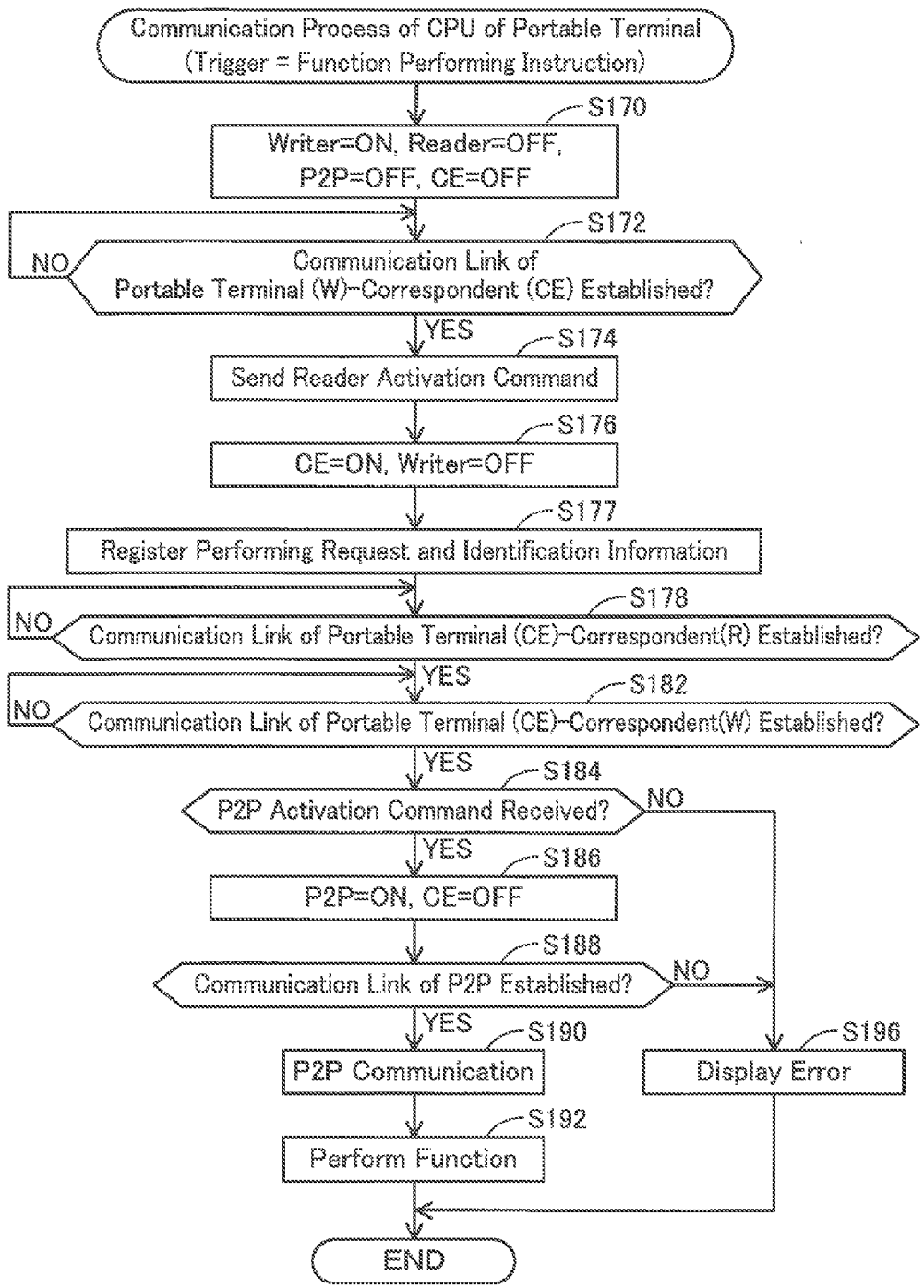

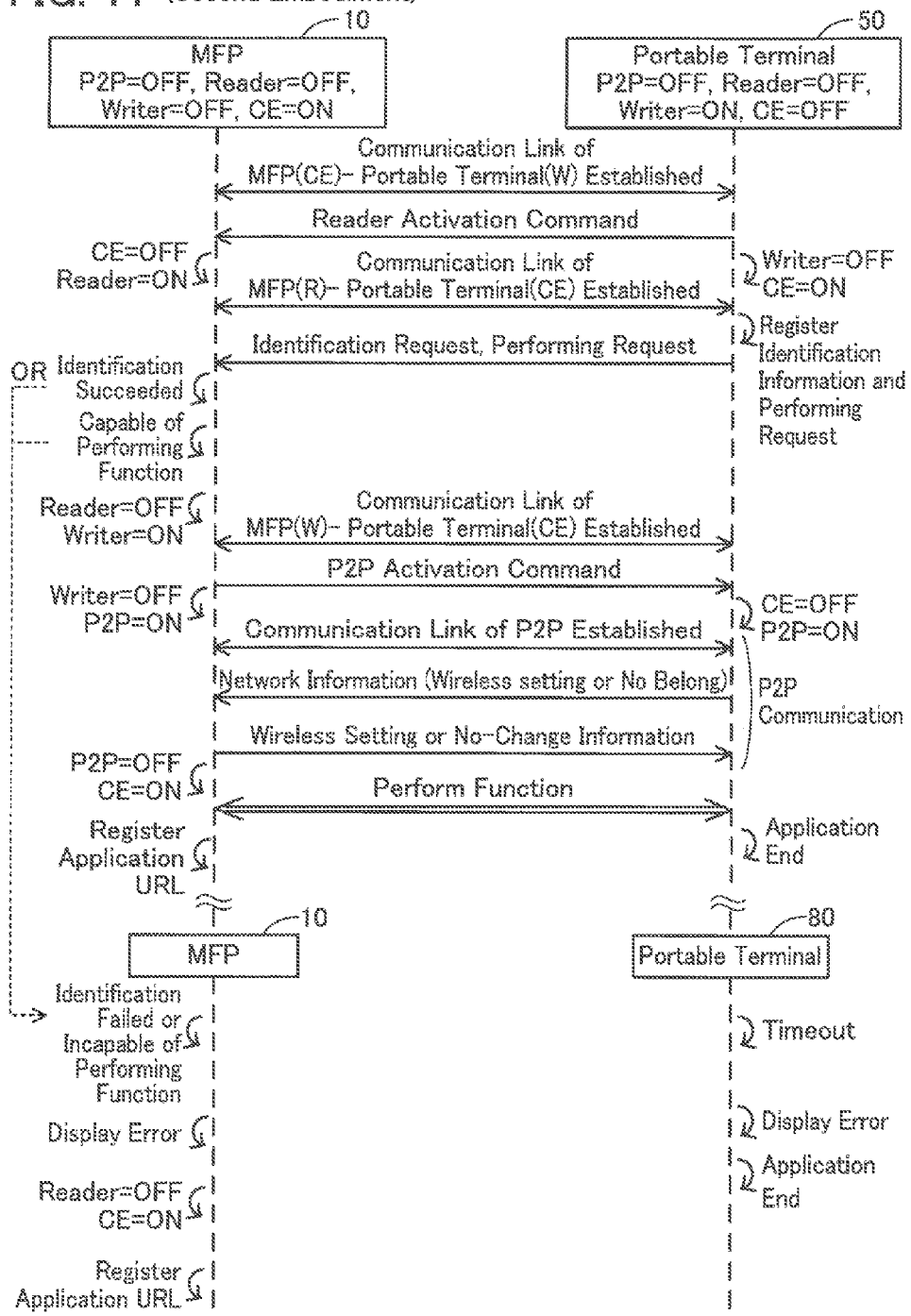
FIG. 11 (Second Embodiment)

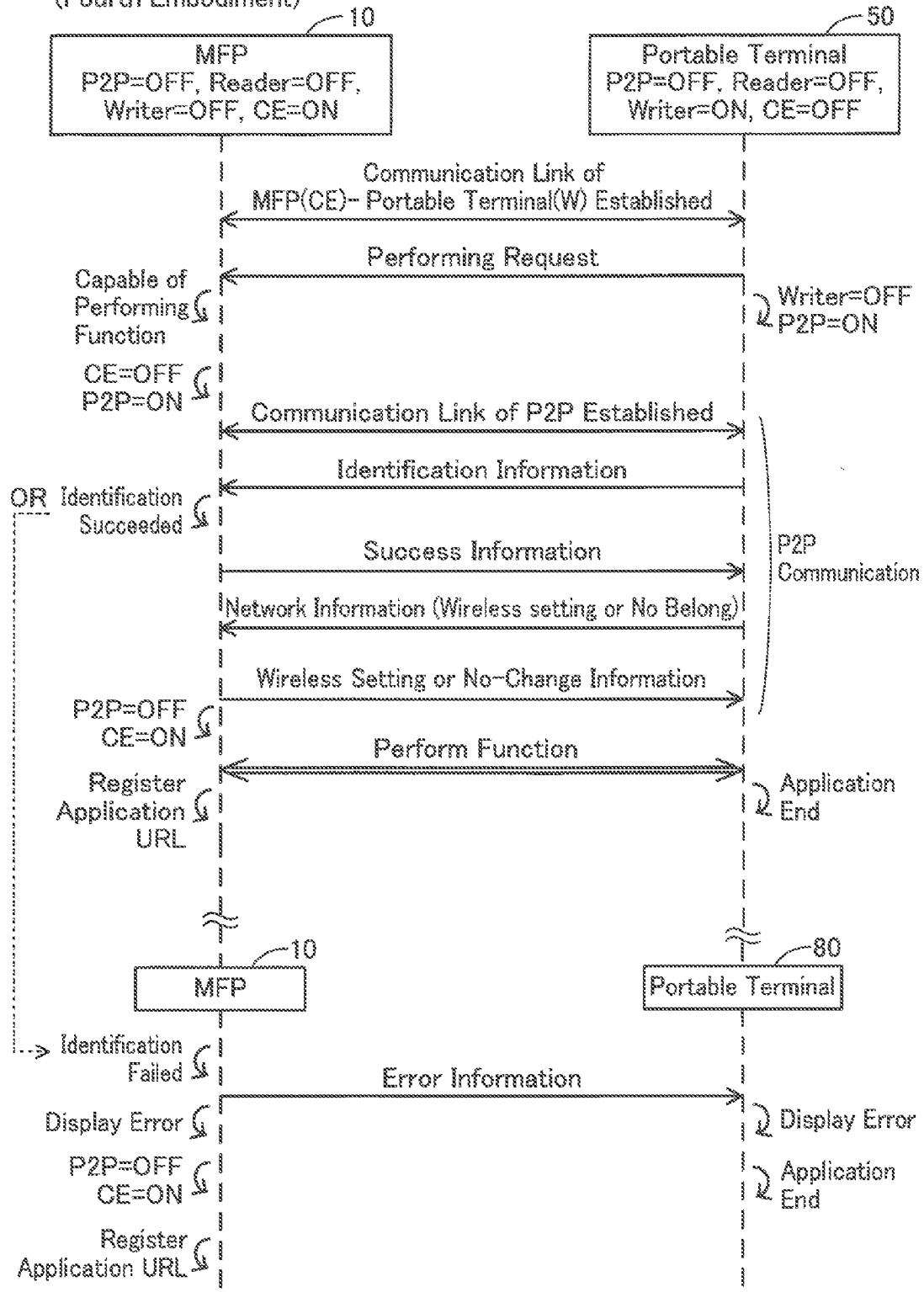

COMMUNICATION DEVICE

CROSS-REFERENCE TO RELATED APPLICATIONS

This application claims priority to Japanese Patent Application No. 2013-068624, filed on Mar. 28, 2013, the contents of which are hereby incorporated by reference into the present application.

TECHNICAL FIELD

The technology disclosed in the present specification relates to a communication device that is capable of communicating with a terminal device.

DESCRIPTION OF RELATED ART

An information processing device for performing an NFC (abbreviation of Near Field Communication) communication with a communication terminal is known. The information processing device switches between CE (abbreviation of Card Emulation) mode of the NFC standard and P2P (abbreviation of Peer to Peer) mode, and performs an NFC communication with the communication terminal.

SUMMARY

In the technique described above, providing the information processing device with an interface different from an interface for NFC communication has not been considered.

In the present specification, a technique is presented which may appropriately perform a communication using a first type of interface and a communication using a second type of interface different from the first type of interface.

One technique disclosed in the present application is a communication device. The communication device may comprise a first type of interface, a second type of interface, and a controller. The first type of interface may be configured to perform a communication with the terminal device according to an NFC (abbreviation of Near Field Communication) scheme complying with an NFC standard. The second type of interface may be configured to perform a communication with the terminal device according to a scheme different from the NFC scheme. The controller may be configured to receive first information from the terminal device by using a first communication link in a case where the first communication link is established via the first type of interface between the communication device and the terminal device, the first communication link being a communication link in which a data communication is to be performed by the communication device operating in a first mode that is different from a P2P (abbreviation of Peer to Peer) mode of the NFC standard and by the terminal device operating in a second mode that is different from the P2P mode and the first mode. The controller may be configured to execute a first determining process related to whether a communication via the second type of interface between the communication device and the terminal device is performable in a case where the first information is received from the terminal device. The controller may be configured to establish a second communication link via the first type of interface between the communication device and the terminal device in the case where the first information is received from the terminal device, the second communication link being a communication link in which a data communication is to be performed by the communication device operating in the P2P mode and the terminal device operating in the P2P mode. The controller may be configured to perform a two-way communication of second information with the terminal device by using the second communication link, in a case where it is determined in the first determining process that the communication via the second type of interface between the communication device and the terminal device is performable, the second information may be information for performing a communication via the second interface between the communication device and the terminal device. The controller may be configured not to perform the two-way communication of the second information with the terminal device, in a case where it is determined in the first determining process that the communication via the second type of interface between the communication device and the terminal device is not performable.

Note that a controlling method, computer-executable instructions, and a non-transitory computer-readable medium for storing the computer-executable instructions which are for realizing the communication device described above are newly useful. A communication system including the communication device and the terminal device is also newly useful. A controlling method, computer-executable instructions, and a non-transitory computer-readable medium for storing the computer-executable instructions which are for realizing the terminal device that is capable of communicating with the communication device described above are also newly useful.

BRIEF DESCRIPTION OF THE DRAWINGS

FIG. 5 shows a flowchart of a function performing process of the CPU of the portable terminal of the first embodiment.

FIG. 6 shows a sequence chart of a communication when an installation of the first embodiment is performed.

FIG. 7 shows a sequence chart of a communication when an identification information registration of the first embodiment is performed.

FIG. 8 shows a sequence chart of a communication when a function of the first embodiment is performed.

FIG. 9 shows a flowchart of a communication process of a CPU of an MFP of a second embodiment.

FIG. 10 shows a flowchart of a function performing process of a CPU of a portable terminal of the second embodiment.

FIG. 11 shows a sequence chart of a communication when a function of the second embodiment is performed.

FIG. 13 shows a sequence chart of a communication when a function of a fourth embodiment is performed.

EMBODIMENT

First Embodiment

Configuration of Communication System

Figure 1:
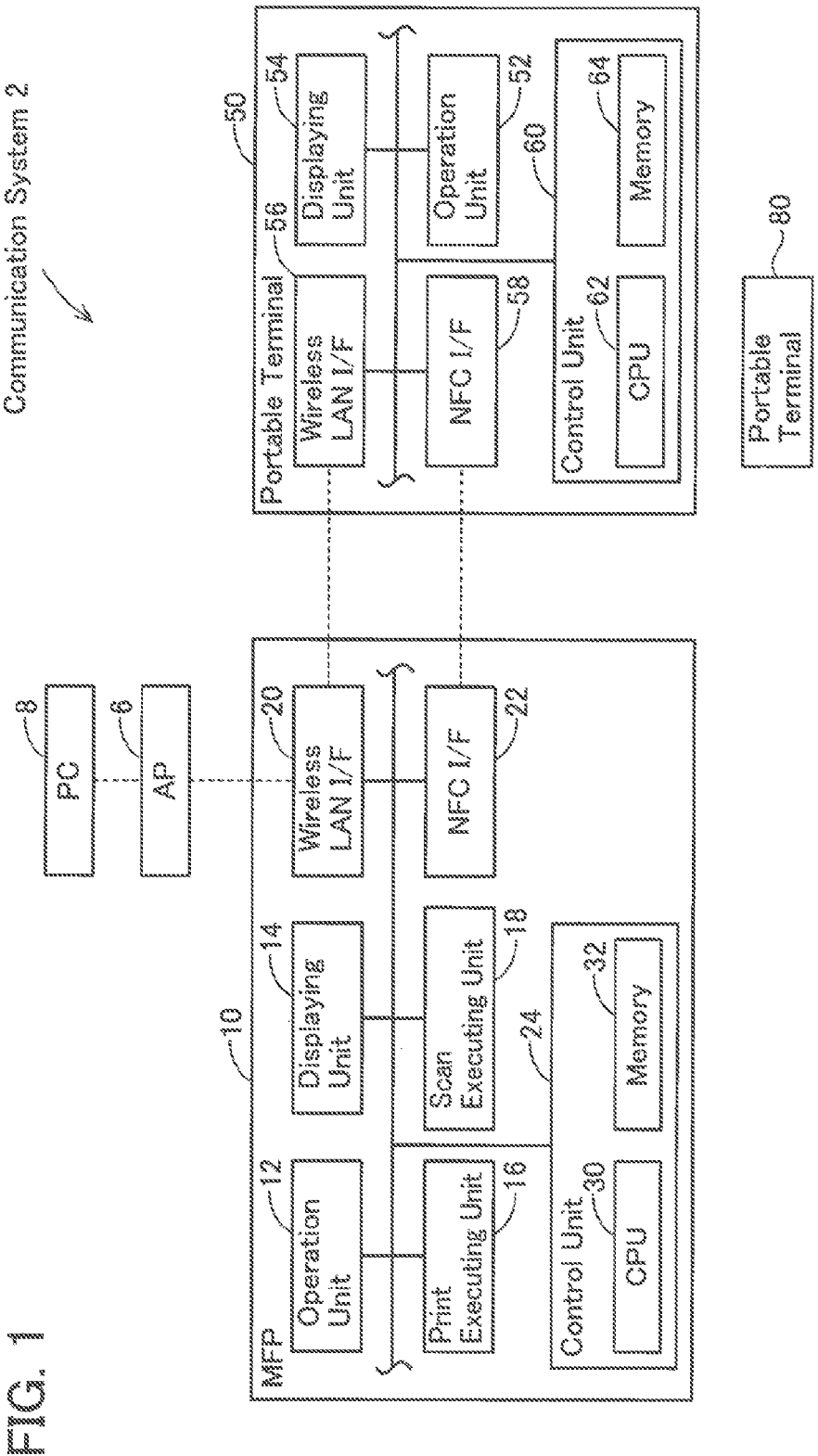
FIG. 1 shows the configuration of a communication system.

As shown in FIG. 1, a communication system 2 comprises a multi-function peripheral (called "MFP" (abbreviation of:

Multi-Function Peripheral) below) 10, a portable terminals 50, 80, an access point (called "AP" below) 6, and a PC 8. The MFP 10 and the portable terminals 50, 80 are capable of performing short-range wireless communication. The short-range wireless communication is according to the wireless communication NFC system. In the present embodiment, the wireless communication is performed according to the NFC system based on international standards ISO/IEC 21481 or 18092.

Further, the PC8, MFP 10, and the portable terminals 50, 80 are each capable of performing wireless communication according to the Wi-Fi Direct system (to be described). Below, Wi-Fi Direct is called "WFD". In WFD, wireless communication is performed based on IEEE (abbreviation of: The Institute of Electrical and Electronics Engineers, Inc.) 802.11 standard and standards based on thereon (e.g., 802.11a, 11b, 11g, 11n, etc.). The NFC system and the system of WFD (called "WFD system" below) have different wireless communication systems (i.e., wireless communication standards). Further, the communication speed of wireless communication according to the WFD system is faster than the communication speed of wireless communication according to the NFC system.

For example, the MFP 10 can construct a WFD network by establishing a connection with the portable terminal 50 according to the WFD system (called "WFD connection" below). Similarly, the MFP 10 can construct a WFD network by establishing a WFD connection with the PC 8.

The PC 8, the MFP 10 and the portable terminals 50, 80 are further capable of performing wireless communication according to a normal Wi-Fi system different from the WFD system. In general terms, wireless communication according to normal Wi-Fi is wireless communication using the AP 6, and wireless communication according to the WFD system is wireless communication not using the AP 6. For example, the MFP 10 can belong to a normal Wi-Fi network by establishing a connection with the AP 6 (called "normal Wi-Fi connection" below) according to normal Wi-Fi. Via the AP 6, the MFP 10 can perform wireless communication with another device belonging to the normal Wi-Fi network (e.g., the PC 8, the portable terminal 50). Moreover, the NFC system and the system of normal Wi-Fi (called "the normal Wi-Fi system" below) have different wireless communication systems (i.e., wireless communication standards). Further, the communication speed of normal Wi-Fi is faster than the communication speed of NFC.

(Configuration of MFP 10)

The MFP 10 comprises an operating unit 12, a displaying unit 14, a print executing unit 16, a scan executing unit 18, a wireless LAN interface (an "interface" is described as "I/F" below) 20, an NFC I/F 22, and a control unit 24. The operating unit 12 includes a plurality of keys. A user can input various instructions to the MFP 10 by operating the operating unit 12. The displaying unit 14 is a display for displaying various types of information. The print executing unit 16 is an ink jet system, laser system, etc. printing mechanism. The scan executing unit 18 is a CCD, CIS, etc. scanning mechanism.

The wireless LAN I/F 20 is an interface for the control unit 30 to perform wireless communication according to the WFD system and wireless communication according to normal Wi-Fi. The wireless LAN I/F 20 is physically one interface. However, a MAC address used in wireless communication according to the WFD system (called "MAC address for WFD" below) and a MAC address used in wireless communication according to normal Wi-Fi (called "MAC address for normal Wi-Fi" below) are both assigned to the wireless LAN I/F 20. More specifically, the MAC address for the normal Wi-Fi is pre-assigned to the wireless LAN I/F 20. Using the MAC address for the normal Wi-Fi, the control unit 30 creates the MAC address for WFD, and assigns the MAC address for WFD to the wireless LAN I/F 20. The MAC address for WFD differs from the MAC address for the normal Wi-Fi. Consequently, via the wireless LAN I/F 20, the control unit 30 can simultaneously perform both wireless communication according to the WFD system and wireless communication according to the normal Wi-Fi. Consequently, a situation can be established in which the MFP 10 belongs to the WFD network and belongs to the normal Wi-Fi network. Moreover, in a variant, an interface for performing wireless communication according to the WFD system and an interface for performing wireless communication according to normal Wi-Fi may be configured by chips which are physically different.

Moreover, by operating the operating unit 12, the user can change the setting of the wireless LAN I/F 20 between a setting capable of performing the wireless communication in accordance with the WFD system (expressed as "WFD I/F setting is ON" below), and a setting not capable of performing the wireless communication in accordance with the WFD system (expressed as "WFD I/F setting is OFF" below). CPU 30 stores a value (ON or OFF) indicating the WFD I/F setting set by the user in the memory 32.

The NFC I/F 22 is an interface for the control unit 24 to perform wireless communication according to the NFC system. The NFC I/F 22 is formed of a chip differing physically from the wireless LAN I/F 20.

Moreover, the communication speed of wireless communication via the wireless LAN I/F 20 (e.g., maximum communication speed is 11 to 600 Mbps) is faster than the communication speed of wireless communication via the NFC I/F 22 (e.g., maximum communication speed is 100 to 424 Kbps). Further, the frequency of the carrier wave in wireless communication via the wireless LAN I/F 20 (e.g., 2.4 GHz band, 5.0 GHz band) differs from the frequency of the carrier wave in the wireless communication via the NFC I/F 22 (e.g., 13.56 MHz band). Further, in a case where the distance between the MFP 10 and the portable terminal 50 is less than or equal to approximately 10 cm, the control unit 30 can wirelessly communicate with the portable terminal 50 according to the NFC system via the NFC I/F 22. In a case where the distance between the MFP 10 and the portable terminal 50 is either less than or equal to 10 cm, or is greater than or equal to 10 cm (e.g., a maximum is approximately 100 m), the control unit 30 can wirelessly communicate, via the wireless LAN I/F 20, with the portable terminal 50 according to the WFD system and according to the normal Wi-Fi. That is, the maximum distance across which the MFP 10 can perform wireless communication with a communication destination apparatus (e.g., the portable terminal 50) via the wireless LAN I/F 20 is greater than the maximum distance across which the MFP 10 can perform the wireless communication with the communication destination apparatus via the NFC I/F 22.

The controller 24 has a CPU 30 and a memory 32. The CPU 30 executes various processes in accordance with program stored in the memory 32. The memory 32 is configured by a ROM, a RAM, a hard disk, and the like. The memory 32 stores therein the program 36 that is executed by the CPU 30.

The program includes an application program and a protocol stack. The application program is a program executed by the CPU 30 to process an application layer of the OSI reference model. The protocol stack is a program executed by the CPU 30 to process a layer lower than the application layer of the OSI reference model. The protocol stack includes a P2P (abbreviation of Peer to Peer) program, a R/W program, and a CE program. The P2P program is a program for executing a process according to a P2P-mode of the NFC standard. The R/W program is a program for executing a process according to a Reader/Writer-mode of the NFC standard. The CE program is a program for executing a process according to a CE (abbreviation of Card Emulation) mode of the NFC standard. These programs are used for executing processes complying with the NFC standards defined by the NFC forum.

Further, if the MFP 10 is currently belonging to a WFD network, the CPU 30 stores, in the memory 32, information indicating that the MFP 10 is currently belonging to the WFD network, and a wireless setting (including authentication scheme, encryption scheme, password, SSID (abbreviation of Service Set Identifier), and BSSID (abbreviation of Basic Service Set Identifier) of a wireless network) to perform a communication of target data (e.g., print data, scan data) via that WFD network. Further, if the MFP 10 is currently belonging to a normal Wi-Fi network, the CPU 30 stores, in the memory 32, information indicating that the MFP 10 is currently belonging to the normal Wi-Fi network, and a wireless setting to perform a communication of target data via that normal Wi-Fi network. Moreover, the SSID is an identifier for identifying the wireless network, and the BSSID is a unique identifier (e.g., a MAC address) of an access point (i.e., a device in G/O state (to be described) in case of the WFD network) which constructs the wireless network.

The memory 32 further stores a value (ON or OFF) indicating the WFD I/F setting. Moreover, in a state where the WFD I/F setting within the memory 32 is OFF, the control unit 24 cannot perform processes in accordance with the WFD scheme. In a state where the WFD I/F setting is ON, the memory 32 further stores a value indicating current state of the MFP 10 relating to the WFD scheme (a state among G/O state, client state, and device state).

Figure 4:
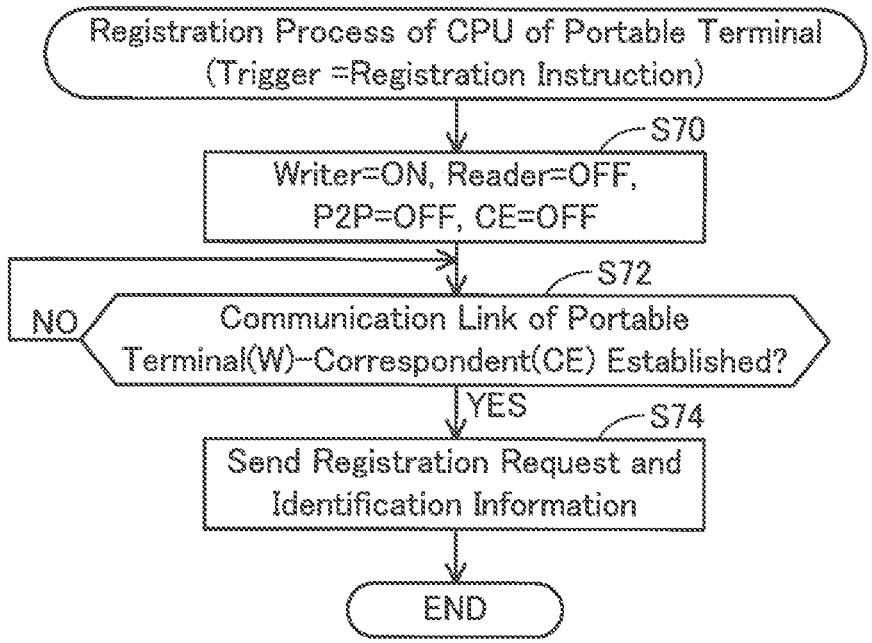
FIG. 4 shows a flowchart of a registration process of the CPU of the portable terminal of the first embodiment.

By performing a registration process (to be described, FIG. 4), the memory 32 further stores identification information of another device (e.g., the portable terminal 50) sent from the other device (see FIG. 4). The identification information is, e.g., an ID (identification information) unique to the portable terminal 50. Further, the memory 32 stores a URL (called "application download URL" below) for causing another device (e.g., the portable terminal 50) to download an application program for the other device to perform various functions (print function, scan function, etc.) utilizing the MFP 10 (called "MFP application" below). The application download URL is stored in advance in the memory 32 by a vendor of the MFP 10.

(Communication of NFC Scheme)

Next, a communication of the NFC scheme will be described. Below, a device capable of performing a communication of the NFC scheme (the MFP 10, the portable terminals 50, 80, etc.) is called an "NFC device". Further, below, Reader mode and Writer mode combined may be described briefly as "R/W mode".

NFC devices include devices capable of using all three modes P2P mode, R/W mode, and CE mode, and devices capable of using only one or two modes of the three modes. In the present embodiment, the MFP 10 and the portable terminal 52 are devices capable of using all three modes. However, the portable terminal 50 is capable of using the P2P mode and R/W mode, but is not capable of using the CE mode. Further, the authentication card 54 is a card of the NFC standard. More specifically, the authentication card 54 is capable of using the CE mode, but is not capable of using the P2P mode and the R/W mode.

The P2P mode is a mode for performing a two-way communication between a pair of NFC devices. For example, a situation is assumed in which the P2P mode is active in both a first NFC device and a second NFC device. In this case, a communication link corresponding to the P2P mode (called "communication link of P2P" below) is established between the first NFC device and the second NFC device. In this case, e.g., the first NFC device sends first data to the second NFC device by using the communication link of P2P. Then, the second NFC device sends second data to the first NFC device by using the same communication link of P2P. Thereby, a two-way communication is realized. An NFC device which is ISO/IEC 1443 Type A, and an NFC device which is ISO/IEC 18092 Type F, these being determined by the NFC Forum, are capable of using the P2P mode, whereas an NFC device which is ISO/IEC 1443 Type B is not capable of using the P2P mode.

The R/W mode and the CE mode are modes for performing a one-way communication between a pair of NFC devices. The CE mode is a mode for an NFC device to operate as a "card", this being a format determined by the NFC Forum. Any Type A NFC device, Type F NFC device, and Type B NFC device is capable of using the CE mode. The Reader mode is a mode for reading data from an NFC device operating as a card in the CE mode. The Writer mode is a mode for writing data to an NFC device operating as a card in the CE mode. Moreover, in the Reader mode, data can also be read from a card of the NFC standard (i.e., the authentication card 54). Further, in the Writer mode, data can also be written to a card of the NFC standard.

For example, a situation is assumed in which the Reader mode is active in the first NFC device, and the CE mode is active in the second NFC device. In this case, a communication link corresponding to the Reader mode and the CE mode is established between the first NFC device and the second NFC device. In this case, using the communication link, the first NFC device executes an operation for reading data from a pseudo card within the second NFC device, thereby receiving the data from the second NFC device.

Further, e.g., a situation is assumed in which the Writer mode is active in the first NFC device, and the CE mode is active in the second NFC device. In this case, a communication link corresponding to the Writer mode and the CE mode is established between the first NFC device and the second NFC device. In this case, using the communication link, the first NFC device executes an operation for writing data to the pseudo card within the second NFC device, thereby sending the data to the second NFC device.

As described above, various combinations of modes can be considered for a pair of NFC devices to perform a communication of the NFC scheme. For example, the following five patterns can be considered as combinations of modes of the pair of NFC devices: "P2P mode, P2P mode", "Reader mode, CE mode", "Writer mode, CE mode", "CE mode, Reader mode", "CE mode, Writer mode".

Moreover, the NFC device cannot form a state in which both the Reader mode and the Writer mode are active. That is, in the NFC device, if the Reader mode is active, the Writer mode is stopped. Further, in the NFC device, if the Writer mode is active, the Reader mode is stopped.

Further, the NFC device can establish a communication link corresponding to a mode that is active, but cannot establish a communication link corresponding to a mode that is not active. For example, in the MFP 10, in a case where the CE mode is active, and the P2P mode and the R/W mode are not active, the MFP 10 can establish a communication link for the MFP 10 to operate in the CE mode, but cannot establish another communication link (i.e., a communication link for the MFP 10 to operate in the P2P mode, the Reader mode, or the Writer mode).

When power of the MFP 10 is turned ON, the MFP 10 shifts to an initial state in which only the CE mode is active, and the P2P mode and the R/W mode are not active. In this embodiment, in a predetermined case (YES in S20 of FIG. 2, YES in S22 of FIG. 2), the MFP 10 shifts from the initial state to a state in which only the P2P mode is active, and the R/W mode and the CE mode are not active (S24). Moreover, while the power of the MFP 10 is ON, the MFP 10 maintains a state in which the R/W mode is not active. Consequently, in a variant, the MFP 10 need not be capable of using the R/W mode.

(WFD)

WFD is a standard formulated by Wi-Fi Alliance. WFD is described in "Wi-Fi Peer-to-Peer (P2P) Technical Specification Version 1.1", created by Wi-Fi Alliance.

As described above, the PC 8, the MFP 10, and the portable terminal 50 are each capable of performing wireless communication according to the WFD system. Below, an apparatus capable of performing wireless communication according to the WFD system is called a "WFD-compatible apparatus". According to the WFD standard, three states are defined as the states of the WFD-compatible apparatus: Group Owner state (called "G/O state" below), client state, and device state. The WFD-compatible apparatus is capable of selectively operating in one state among the three states.

One WFD network includes an apparatus in the G/O state and an apparatus in the client state. Only one G/O state apparatus can be present in the WFD network, but one or more client state apparatuses can be present. The G/O state apparatus manages the one or more client state apparatuses. Specifically, the G/O state apparatus creates an administration list in which identification information (i.e., MAC address) of each of the one or more client state apparatuses is written. When a client state apparatus newly belongs to the WFD network, the G/O state apparatus adds the identification information of that apparatus to the administration list, and when the client state apparatus leaves the WFD network, the G/O state apparatus deletes the identification information of that apparatus from the administration list.

The G/O state apparatus is capable of wirelessly communicating object data (e.g., data that includes network layer information of the OSI reference model (print data, scan data, etc.)) with an apparatus registered in the administration list, i.e., with a client state apparatus (i.e., an apparatus belonging to the WFD network). However, with an unregistered apparatus which is not registered in the administration list, the G/O state apparatus is capable of wirelessly communicating data for the unregistered apparatus to participate in the WFD network (e.g., data that does not include network layer information (physical layer data such as a Probe Request signal, Probe Response signal, etc.)), but is not capable of wirelessly communicating the object data. For example, the MFP 10 that is in the G/O state is capable of wirelessly receiving print data from the portable terminal 50 that is registered in the administration list (i.e., the portable terminal 50 that is in the client state), but is not capable of wirelessly receiving print data from an apparatus that is not registered in the administration list.

Further, the G/O state apparatus is capable of relaying the wireless communication of object data (print data, scan data, etc.) between a plurality of client state apparatuses. For example, in a case where the portable terminal 50 that is in the client state is to wirelessly send print data to another printer that is in the client state, the portable terminal 50 first wirelessly sends the print data to the MFP 10 that is in the G/O state. In this case, the MFP 10 wirelessly receives the print data from the portable terminal 50, and wirelessly sends the print data to the other printer. That is, the G/O state apparatus is capable of performing the function of an AP of the normal wireless network.

Moreover, a WFD-compatible apparatus that does not belong to the WFD network (i.e., an apparatus not registered in the administration list) is a device state apparatus. The device state apparatus is capable of wirelessly communicating data for belonging to the WFD network (physical layer data such as a Probe Request signal, Probe Response signal, etc.), but is not capable of wirelessly communicating object data (print data, scan data, etc.) via the WFD network.

(Configuration of Portable Terminals 50, 80)

The portable terminal 50 is a portable terminal such as a mobile phone (e.g., a Smart Phone), PDA, notebook PC, tablet PC, portable music playback device, portable video playback device, etc. The portable terminal 80 has a configuration the same as that of the portable terminal 50. The portable terminal 50 comprises an operation unit 52, a displaying unit 54, a wireless LAN I/F 56, an NFC I/F 58, and a control unit 60. The operation unit 52 comprises a plurality of keys. The displaying unit 54 is a display for displaying various information. In a variant, the portable terminal 50 may have a touch panel having functions of both the operation unit 52 and the displaying unit 54.

The wireless LAN I/F 56 and the NFC I/F 58 are interfaces the same as the wireless LAN I/F 20 and the NFC I/F 22 of the MFP 10 respectively. That is, via the wireless LAN I/F 56, the control unit 60 is capable of simultaneously performing both a wireless communication in accordance with the WFD scheme, and a wireless communication in accordance with normal Wi-Fi. Further, via the NFC I/F 58, the control unit 60 is capable of performing a wireless communication in accordance with the NFC scheme.

The control unit 60 comprises a CPU 62 and a memory 64. The CPU 62 performs various processes according to a program stored in the memory 64. The memory 64 is configured by a ROM, a RAM, a hard disk, etc. The memory 64 stores therein the program that is performed by the CPU 62. As in the case of the MFP 10, the program includes an application program and a protocol stack. The application program is an application program for causing the MFP 10 to perform various functions (e.g., print function, scan function, etc.) (called "MFP application" below). By performing an install process (to be described, FIG. 3), the CPU 62 can download the MFP application and install the downloaded MFP application in the memory 64.

The memory 64 further stores identification information of the portable terminal 50. As described above, the identification information of the portable terminal 50 is an ID (identification information) unique to the portable terminal 50. The identification information of the portable terminal 50 is stored in advance in the memory 64 by a vendor of the portable terminal 50 at the time of shipping the portable terminal 50.

The portable terminal 50 comprises a first OS (abbreviation of Operation System) program. The first OS program is, e.g., Android (registered trademark) version 4.0. The first OS program operates the portable terminal 50 as follows. That is, when the power of the portable terminal 50 is turned ON, the portable terminal 50 shifts to an initial state in which the P2P mode and the Reader mode are active, and the Writer mode is not active (see S50 of FIG. 3). If the MFP application has not been installed, the portable terminal 50 maintains the initial state. If the MFP application is not active despite the MFP application having been installed, the portable terminal 50 maintains the initial state. Upon the MFP application being active, the portable terminal 50 shifts from the initial state to a state in which the Writer mode is active, and the Reader mode and the P2P mode are not active. Moreover, the portable terminal 50 can download the MFP application from an internet server (not shown) provided by a vendor of the first OS program, and install the downloaded MFP application in the memory 64.

(Poll Operation and Listen Operation)

Next, a Poll operation and a Listen operation executed by the NFC device will be described. For example, in the MFP 10, the CPU 32 does not execute the Poll operation and the Listen operation according to the program 36, but the NFC I/F 22 executes the Poll operation and the Listen operation. The Poll operation is an operation in which a polling signal is sent, and a response signal in response to the polling signal being received. Further, the Listen operation is an operation in which a polling signal is received, and a response signal in response to the polling signal is sent.

The NFC I/F 22 of the MFP 10 is capable of operating in any mode of Poll mode for executing the Poll operation, Listen mode for executing the Listen operation, and a mode in which neither the Poll operation nor the Listen operation are executed (called "non-execution mode" below). The NFC I/F 22 operates sequentially in the Poll mode, the Listen mode, and the non-execution mode. For example, the NFC I/F 22 executes one set of operations in which the NFC I/F 22 operates in the Poll mode, then operates in the Listen mode, and then operates in the non-execution mode. The NFC I/F 22 repeatedly executes the one set of operations.

In the Poll mode, the NFC I/F 22 sends a polling signal, and monitors whether a response signal is received. Specifically, the NFC I/F 22 repeats the following operation: (1) sending a polling signal to which a Type A NFC device can respond (i.e., a polling signal corresponding to Type A), and monitoring reception of a response signal for a predetermined time, (2) if not receiving a response signal, sending a polling signal to which a Type B NFC device can respond (i.e., a polling signal corresponding to Type B), and monitoring reception of a response signal for a predetermined time and, (3) if not receiving a response signal, sending a polling signal to which a Type F NFC device can respond (i.e., a polling signal corresponding to Type F), and monitoring reception of a response signal for a predetermined time. In a case where the NFC I/F 22 receives a response signal from an NFC device within the predetermined time, the NFC device can be said to be of a Type of NFC device corresponding to the polling signal received immediately prior to sending the response signal. In case of the NFC I/F 22 receiving the response signal, further, the NFC device that is the source of the response signal sends, to the NFC device, a query signal for inquiring which mode is active. Consequently, the NFC I/F 22 receives an activation mode signal from the NFC device. The activation mode signal indicates that both the P2P mode and the CE mode are active in the NFC device, that only the P2P mode is active, or that only the CE mode is active.

In the Listen mode, the NFC I/F 22 monitors whether a polling signal is received and, upon receiving the polling signal, sends a response signal. The NFC I/F 22 sends a response signal to the NFC device that is the source of the polling signal only in case of receiving a polling signal of the Type corresponding to the NFC I/F 22. In case of sending the response signal to the NFC device, the NFC I/F 22 further receives a query signal from the NFC device, and sends an activation mode signal to the NFC device.

In the non-execution mode, the NFC I/F 22 does not send a polling signal and, further, does not send a response signal even if receiving a polling signal.

Each of the portable terminals 50, 80 also repeatedly executes the aforementioned one set of operations. Consequently, e.g., in a case where distance between the MFP 10 and the portable terminal 50 is less than 10 cm and a period in which the NFC I/F 22 of the MFP 10 is operating in the Poll mode matches a period in which the portable terminal 50 is operating in the Listen mode, the NFC I/F 22 executes the Poll operation of sending a polling signal to the portable terminal 50 and receiving a response signal from the portable terminal 50. Further, e.g., in a case where distance between the MFP 10 and the portable terminal 50 is less than 10 cm and a period in which the NFC I/F 22 is operating in the Listen mode matches a period in which the portable terminal 50 is operating in the Poll mode, the NFC I/F 22 executes the Listen operation of receiving a polling signal from the portable terminal 50 and sending a response signal to the portable terminal 50. Moreover, below, the NFC device which executed the Poll operation, and the NFC device which executed the Listen operation are called "Poll device" and "Listen device" respectively.

In a case where the NFC I/F 22 executes the Poll operation, i.e., in a case where the MFP 10 is the Poll device, processes for subsequent communication are taken over by the CPU 32. Specifically, first, information is delivered from the NFC I/F 22 to the CPU 32, this information indicating the mode in which the NFC device that is the Listen device (e.g., the portable terminal 50) is capable of executing operation (i.e., information indicating the received activation mode signal).

For example, in a case where the current state of the MFP 10, which is the Poll device, is a state in which the P2P mode is active and other modes (the CE mode and the R/W mode) are not active, and information delivered from the NFC I/F 22 indicates that the P2P mode is active in the communication correspondent, which is the Listen device, the CPU 30 sends an Activation command corresponding to the P2P mode to the communication correspondent, and receives an OK command from the communication correspondent. Thereby, a communication link of the P2P mode is established between the MFP 10, which is the Poll device, and the communication correspondent, which is the Listen device.

Further, e.g., in a case where the current state of the MFP 10, which is the Listen device, is a state in which the P2P mode is active and other modes are not active, and the current state of the communication correspondent, which is the Poll device, is a state in which the P2P mode is active, the CPU 30 receives an Activation command corresponding to the P2P mode from the communication correspondent. In this case, the CPU 30 determines that the MFP 10 is to operate in the P2P mode, and sends an OK command to the communication correspondent. Thereby, a communication link of P2P is established between the MFP 10, which is the Listen device, and the communication correspondent, which is the Poll device.

Further, e.g., in a case where the current state of the MFP 10, which is the Listen device, is a state in which the CE mode is active and the P2P mode is not active, and the current state of the communication correspondent, which is the Poll device, is a state in which the Reader mode or the Writer mode is active, the CPU 32 receives an Activation command corresponding to the R/W mode from the communication correspondent. In this case, the CPU 30 determines that the MFP 10 is to operate in the CE mode and sends an OK command to the communication correspondent. Thereby, a communication link corresponding to the CE mode and the R/W mode is established between the MFP 10 that is the Listen device and the communication correspondent which is the Poll device.

Moreover, in case the communication link corresponding to the CE mode and the R/W mode is established, the CPU 30 further receives information from the NFC device indicating whether the NFC device is operating in the Reader mode or the Writer mode. Consequently, e.g., in case of receiving information indicating that the NFC device is operating in the Reader mode, a communication link corresponding to the CE mode and the Reader mode can be said to be established between the MFP 10, which is the Listen device, and the NFC device, which is the Poll device (called "communication link of MFP (CE)-NFC device (R)" below). Further, e.g., in case of receiving information indicating that the NFC device is operating in the Writer mode, a communication link corresponding to the CE mode and the Writer mode can be said to be established between the MFP 10, which is the Listen device, and the NFC device, which is the Poll device, (called "communication link of MFP (CE)-NFC device (W)" below).

(Configuration of PC 8)

The PC 8 comprises a wireless LAN I/F (i.e., WFD and normal Wi-Fi interface), but does not comprise an NFC I/F. Consequently, the PC 8 is capable of performing a communication with the MFP 10 by utilizing a wireless LAN, but is not capable of performing a wireless communication of the NFC scheme. The PC 8 comprises a driver program for causing the MFP 10 to perform a function (e.g., print function, scan function, etc.). Moreover, the driver program is usually installed on the PC 8 from a media shipped together with the MFP 10. However, in a variant, the driver program may be installed on the PC 8 from a server provided by the vendor of the MFP 10.

(Configuration of AP 6)

The AP 6 is not a WFD scheme G/O state device, but is a normal AP called a wireless access point or wireless LAN router. The AP 6 can establish a normal Wi-Fi connection with a plurality of devices. Thereby, a normal Wi-Fi network including the AP 6 and the plurality of devices is constructed. The AP 6 receives data from one device among the plurality of devices belonging to the normal Wi-Fi network, and sends the data to another one device among the plurality of devices. That is, the AP 6 relays communication between a pair of devices belonging to the normal Wi-Fi network.

Figure 2:
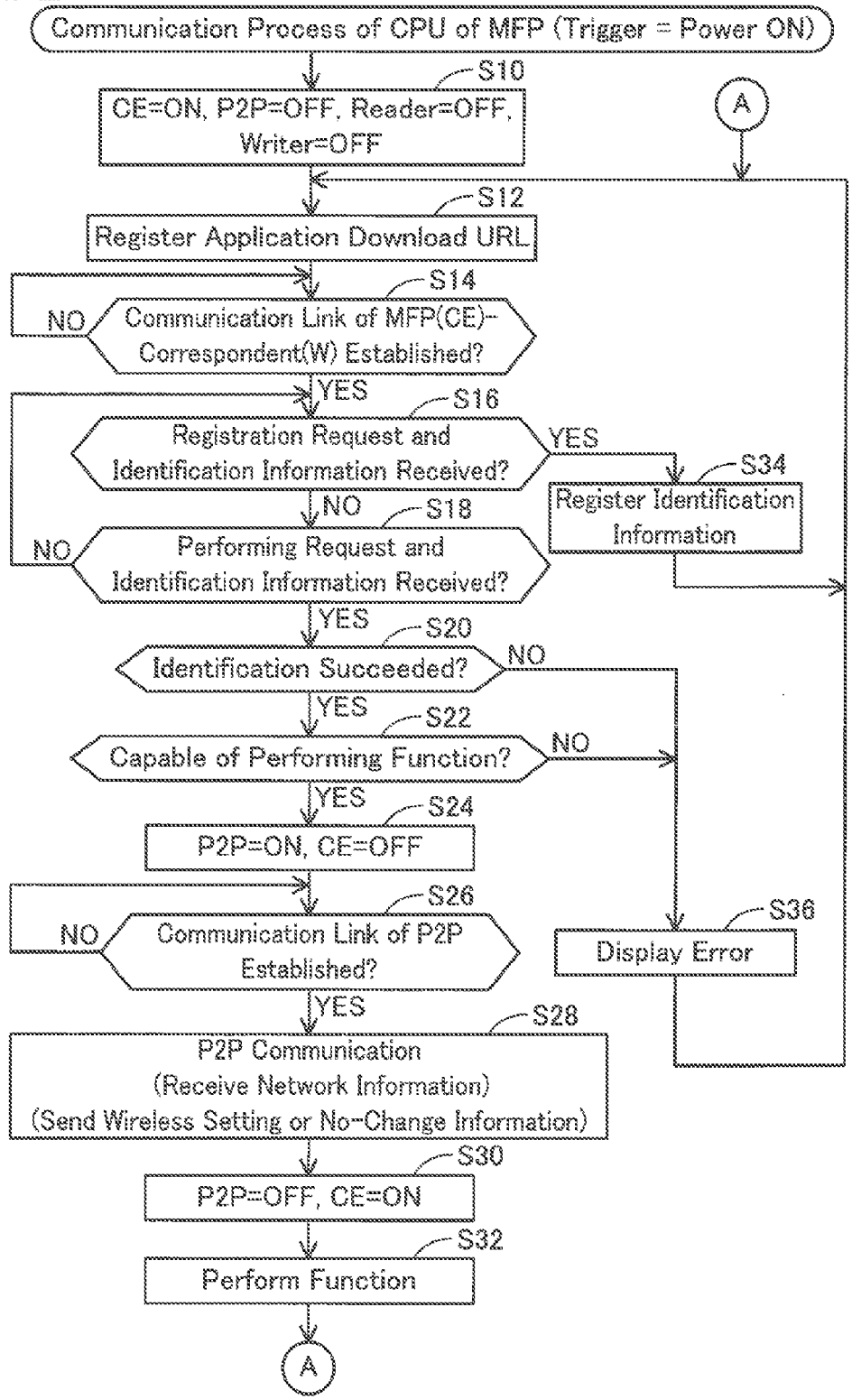
FIG. 2 shows a flowchart of a communication process of a CPU of an MFP of a first embodiment.

(Communication Process Executed by CPU 30 of MFP 10; FIG. 2)

Next, contents of a communication process executed in accordance with the program of the CPU 30 of the MFP 10 will be described with reference to FIG. 2. When the power of the MFP 10 is turned ON, the CPU 30 starts the communication process of FIG. 2. In S10, the CPU 30 shifts the state of the MFP 10 to an initial state in which the CE mode is active, and other modes (the P2P mode and the R/W mode) are not active.

Next, in S12, the CPU 30 registers the application download URL in the NFC I/F 22. Specifically, the CPU 30 stores the application download URL stored in the memory 32 on a chip configuring the NFC I/F 22. If the communication link of MFP (CE)-correspondent (R) is established with a communication correspondent operating in the Reader mode (e.g., the portable terminal 50), the NFC I/F 22 sends the registered application download URL to the communication correspondent by using the communication link.

Next, in S14, the CPU 30 monitors whether the communication link of MFP (CE)-correspondent (W) is established. As described above, if an Activation command corresponding to the Writer mode is received from the communication correspondent (e.g., the portable terminal 50), the CPU 30 determines that the communication link of MFP (CE)-correspondent (W) has been established. In this case, the CPU 30 determines YES in S14, and proceeds to S16 and S18.

In S16, the CPU 30 monitors whether a registration request and identification information has been received from the communication correspondent via the NFC I/F 22 by utilizing the communication link of MFP (CE)-correspondent (W). The registration request is a request signal requesting the identification information of the communication correspondent to be stored in the memory 32. If the registration request and the identification information of the communication correspondent are received from the communication correspondent operating in the Writer mode, the CPU 30 determines YES in S16, and proceeds to S34. At this occasion, upon receiving the registration request and the identification information from the communication correspondent, the chip configuring the NFC I/F 22 stores the received registration request and the identification information instead of the application download URL. Next, the NFC I/F 22 delivers the received registration request and the identification information to the CPU 30. Below, in the present specification, the description is given with the assumption that, if receiving the registration request and the identification information from the communication correspondent via the NFC I/F 22, the CPU 30 executes the same processes as above. In S34, the CPU 30 stores the received identification information in the memory 32. Upon ending S34, the CPU 30 returns to S12, and again registers the application download URL in the NFC I/F 22. Next, the CPU 30 again executes the processes from S14 onwards.

In S18, the CPU 30 monitors whether a performing request and identification information are received from the communication correspondent via the NFC I/F 22 by utilizing the communication link of MFP (CE)-correspondent (W). The performing request is a request signal requesting the MFP 10 to perform a specific function (e.g., scan function, print function). If the performing request and the identification information of the communication correspondent are received from the communication correspondent operating in the Writer mode, the CPU 30 determines YES in S18, and proceeds to S20. At this occasion, upon receiving the performing request and the identification information from the communication correspondent, the chip configuring the NFC I/F 22 stores the received performing request and the identification information instead of the application download URL. Next, the NFC I/F 22 delivers the received performing request and the identification information to the CPU 30. Below, in the present specification, the description is given with the assumption that, if receiving the performing request and the identification information from the communication correspondent, the CPU 30 executes the same processes as above.

In S20, the CPU 30 determines whether identification has succeeded. Specifically, in S20, the CPU 30 determines whether identification information identical to the received identification information is being stored within the memory 32. If registration of the identification information of the communication correspondent (S34) has already been performed at the time of S20, identification information identical to the received identification information is already being stored within the memory 32. If identification information identical to the received identification information is being stored within the memory 32, the CPU 30 determines that identification has succeeded. In this case, the CPU 30 determines YES in S20, and proceeds to S22. On the other hand, if registration of the identification information of the communication correspondent (S34) has not been performed at the time of S20, identification information identical to the received identification information is not being stored within the memory 32. If identification information identical to the received identification information is not being stored within the memory 32, the CPU 30 determines that identification has failed. In this case, the CPU 30 determines NO in S20, and proceeds to S36. In this case, in S36, the CPU 30 causes the displaying unit 14 to display an error screen including a message indicating that identification has failed. Upon ending S36, the CPU 30 returns to S12, and again registers the application download URL in the NFC I/F 22. Next, the CPU 30 again executes the processes from S14 onwards.

In S22, the CPU 30 determines whether the MFP 10 is capable of performing the specific function indicated by the performing request. For example, if the specific function is print, in S22, the CPU 30 verifies whether, in the print executing unit 16, an error has occurred such as a device error, such as a paper jam, failure of the printing mechanism, etc., or an error in consumable items, such as out of toner (ink), out of paper, etc. Specifically, the CPU 30 checks the state of the units (the print executing unit 16, the scan executing unit 18, etc.) of the MFP 10, determines whether a device error has occurred, and determines whether a remaining amount of consumable items is zero. Consequently, if neither a device error nor a consumable items error has occurred in the print executing unit 16, the CPU 30 determines that the function is performable. In this case, the CPU 30 determines YES in S22, and proceeds to S24. On the other hand, if at least one of the device error or the consumable items error has occurred in the print executing unit 16, the CPU 30 determines that the function is not performable. In this case, the CPU 30 determines NO in S22, and proceeds to S36. Similarly, e.g., if the specific function is scan, in S22 the CPU 30 verifies whether an error has occurred in the scan executing unit 18 (e.g., document feed mechanism error, sensor error, etc.). Consequently, if an error has not occurred in the scan executing unit 18, the CPU 30 determines that the function is performable (YES in S22), and proceeds to S24. On the other hand, if an error has occurred in the scan executing unit 18, the CPU 30 determines that the function is not performable (NO in S22), and proceeds to S36. In this case, in S36, the CPU 30 causes the displaying unit 14 to display an error screen including a message indicating that the specific function is not performable. Upon ending S36, the CPU 30 returns to S12, and again registers the application download URL in the NFC I/F 22. Next, the CPU 30 again executes the processes from S14 onwards.

In S24, the CPU 30 stops the CE mode, and activates the P2P mode. Specifically, first, the CPU 30 disconnects the communication link of MFP (CE)-correspondent (W). That is, the CPU 30 performs a communication of a Deactivation command and an OK command. In the NFC standard, it is determined that the Poll device sends the Deactivation command, i.e., that the Listen device receives the Deactivation command. When the disconnection of the communication link of MFP (CE)-correspondent (W) is to be performed, the communication correspondent is the Poll device, and the MFP 10 is the Listen device. Consequently, the CPU 30 receives the Deactivation command from the communication correspondent via the NFC I/F 22, and sends the OK command to the communication correspondent via the NFC I/F 22. Consequently, the communication link of MFP (CE)-correspondent (W) is disconnected. Moreover, in the present embodiment, as will be described, the communication correspondent (the portable terminal 50) stops the Writer mode, and activates the P2P mode after having sent the performing request and the identification information to the MFP 10 (see S94, S96 of FIG. 5). Consequently, the disconnection of the communication link of MFP (CE)-correspondent (W) is performed at any timing from the time of determining YES in S18 to the time of S24. After the communication link of MFP (CE)-correspondent (W) has been disconnected, the CPU 30 stops the CE mode, and activates the P2P mode. Consequently, the CPU 30 can change the state of the MFP 10 from the initial state to a state in which the P2P mode is active, and the R/W mode and the CE mode are not active.

Next, in S26, the CPU 30 monitors whether a communication link of P2P is established. As described above, e.g., if the MFP 10 is the Poll device, if the CPU 30 sends an Activation command corresponding to the P2P mode to the communication correspondent and receives an OK command from the communication correspondent, the CPU 30 determines that the communication link of P2P has been established. In this case, the CPU 30 determines YES in S26, and proceeds to S28. Further, e.g., if the MFP 10 is the Listen device, if the CPU 30 receives the Activation command corresponding to the P2P mode from the communication correspondent, and sends the OK command to the communication correspondent, the CPU 30 determines that the communication link of P2P has been established. In this case, also, the CPU 30 determines YES in S26, and proceeds to S28.

In S28, the CPU 30 performs a two-way communication (may be called "P2P communication" below) with the communication correspondent (e.g., the portable terminal 50) via the NFC I/F 22 by utilizing the communication link of P2P. Specifically, first, the CPU 30 receives, from the communication correspondent, network information relating to the network to which the communication correspondent belongs. Detailed contents of the network information will be described later. Next, the CPU 30 sends, to the communication correspondent, one of either setting information (authentication scheme, encryption scheme, password, SSID, BSSID, etc.) indicating the wireless setting of the network to which the CPU 30 is belonging, or no-change information indicating that the setting does not need to be changed. As described below, the contents of the two-way communication performed in S28 differs according to whether the communication correspondent is belonging to a network. Below, the contents of the two-way communication performed in S28 is described as separate cases.

(Two-Way Communication in Case Communication Correspondent is Belonging to Network (S28))

In case the communication correspondent is belonging to a network, first, the communication correspondent sends, to the MFP 10, a wireless setting (SSID, BSSID) of the network (normal Wi-Fi network or WFD network) to which the communication correspondent is belonging. The CPU 30 receives the wireless setting of the network to which the communication correspondent is belonging. In this case, the wireless setting of the network to which the communication correspondent is belonging is the "network information" of the communication correspondent.

Next, based on the received wireless setting, the CPU 30 determines whether the MFP 10 is belonging to the same network as the communication correspondent. That is, the CPU 30 determines whether each of the received SSID, BSSID are identical to each of the SSID, BSSID included in the wireless setting of the network to which the MFP 10 belongs. In case of determining that the MFP 10 is belonging to the same network as the communication correspondent, the CPU 30 sends the no-change information, indicating that it is not necessary to change the setting, to the communication correspondent.

By contrast, if it is determined that the network to which the MFP 10 belongs and the network to which the communication correspondent belongs are different, the CPU 30 sends, to the communication correspondent, the wireless setting (authentication scheme, encryption scheme, password, SSID, BSSID) of the WFD network in which the MFP 10 is the G/O. For example, if the MFP 10 is belonging to the WFD network as the G/O, the CPU 30 sends the wireless setting being utilized in that WFD network to the communication correspondent. Further, e.g., if the MFP 10 is not belonging to a WFD network in which the MFP 10 is the G/O, the CPU 30 shifts the MFP 10 to G/O, newly forms a WFD network, and sends the wireless setting of that WFD network to the communication correspondent.

(Two-Way Communication in Case Communication Correspondent is not Belonging to Network (S28))

In case the communication correspondent is not belonging to a network, first, the communication correspondent sends, to the MFP 10, information indicating that the communication correspondent is not belonging to a network. The CPU 30 receives the information indicating that the communication correspondent is not belonging to a network. In this case, the information indicating that the communication correspondent is not belonging to a network is the "network information" of the communication correspondent.

Next, the CPU 30 determines whether the MFP 10 is belonging to a WFD network in which the MFP 10 is the G/O. If the MFP 10 is belonging to a WFD network in which the MFP 10 is the G/O, the CPU 30 sends the wireless setting being utilized in that WFD network to the communication correspondent.

By contrast, if the MFP 10 is not belonging to a WFD network in which the MFP 10 is the G/O, the CPU 30 shifts the MFP 10 to G/O, newly forms a WFD network, and sends the wireless setting of that WFD network to the communication correspondent.

As a result of the two-way communication of S28, the MFP 10 and the communication correspondent become capable of utilizing a common wireless setting. By utilizing the common wireless setting, the CPU 30 establishes, with the communication correspondent, a wireless communication link (WFD connection or normal Wi-Fi connection) which utilizes the wireless LAN I/F 20.

Next, in S30, the CPU 30 stops the P2P mode, and activates the CE mode. Specifically, first, the CPU 30 disconnects the communication link of P2P. That is, as in S24, the CPU 30 performs a communication of the Deactivation command and the OK command. Consequently, the communication link of P2P is disconnected. Next, the CPU 30 stops the P2P mode, and activates the CE mode. Consequently, the CPU 30 can return the state of the MFP 10 to the initial state.

Next, in S32, the CPU 30 performs the specific function. Specifically, in S32, the CPU 30 communicates target data, which is the target of the function performed via the wireless LAN I/F 20, with the communication correspondent by utilizing the established wireless communication link. For example, if the specific function is print, print data (the target data) is sent from the communication correspondent to the MFP 10. Upon receiving the target data, the CPU 30 causes the print executing unit 16 to print an image represented by the target data. Further, e.g., if the specific function is scan, the CPU 30 causes a document set on the document feed mechanism of the scan executing unit 18 to be scanned, creating scan data (the target data). The CPU 30 sends the created target data to the communication correspondent.

Upon ending S32, the CPU 30 returns to S12, and again registers the application download URL in the NFC I/F 22. Next, the CPU 30 again executes the processes from S14 onwards.

Figure 3:
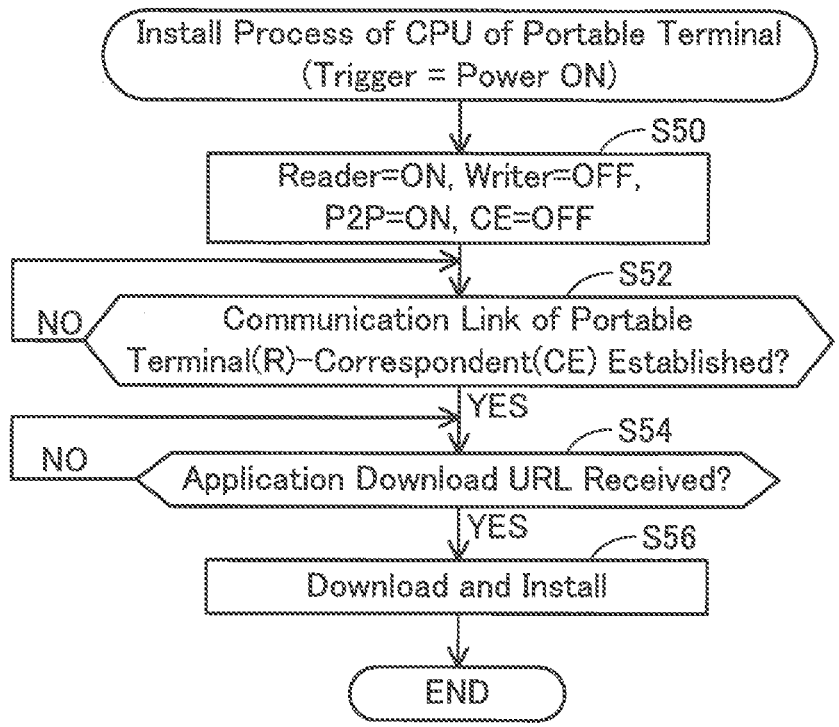
FIG. 3 shows a flowchart of an install process of a CPU of a portable terminal of the first embodiment.

(Install Process Executed by CPU 62 of Portable Terminal 50; FIG. 3)

Next, contents of the install process executed by the CPU 62 of the portable terminal 50 in accordance with a program will be described with reference to FIG. 3. Upon executing the install process of FIG. 3, the MFP application has not been installed in the memory 64 of the portable terminal 50. When the power of the portable terminal 50 is turned ON, in S50 the CPU 62 shifts the state of the portable terminal 50 to the initial state in which the Reader mode and the P2P mode are active, and other modes (the Writer mode and the CE mode) are not active.

Next, in S52, the CPU 62 monitors whether a communication link of portable terminal (R)-correspondent (CE) is established. If the CPU 62 sends an Activation command corresponding to the Reader mode to the communication correspondent (i.e., the MFP 10), and receives an OK command from the MFP 10, the CPU 62 determines that the communication link of portable terminal (R)-correspondent (CE) has been established. In this case, the CPU 62 determines YES in S52, and proceeds to S54.

In S54, the CPU 62 monitors whether the application download URL is received from the communication correspondent (i.e., the MFP 10) via the NFC I/F 58 by utilizing the communication link of portable terminal (R)-correspondent (CE). If the application download URL is received from the MFP 10 which is operating in the CE mode, the CPU 62 determines YES in S54, and proceeds to S56.

In S56, the CPU 62 accesses an internet server indicated by the application download URL (a server provided by the vendor of the first OS) in accordance with the received application download URL. The CPU 62 downloads the MFP application from the server. Next, the CPU 62 installs the downloaded MFP application in the memory 64. Upon completing installation, the CPU 62 is capable of executing various processes in accordance with the MFP application. Upon ending S56, the CPU 62 ends the install process of FIG. 3.

(Registration Process Executed by CPU 62 of Portable Terminal 50; FIG. 4)

Next, contents of a registration process executed by the CPU 62 of the portable terminal 50 in accordance with the MFP application program will be described with reference to FIG. 4. Upon executing the registration process of FIG. 4, the MFP application has already been installed in the memory 64 of the portable terminal 50. Upon input of a registration instruction in the operation unit 52 after the MFP application has been activated, the CPU 62 starts the registration process of FIG. 4. The CPU 62 executes the registration process of FIG. 4 in accordance with the MFP application. In S70, the CPU 62 shifts the state of the portable terminal 50 to a state in which the Writer mode is active, and other modes (the Reader mode, the P2P mode, and the CE mode) are not active.

Next, in S72, the CPU 62 monitors whether a communication link of portable terminal (W)-correspondent (CE) is established. If the CPU 62 sends an Activation command corresponding to the Writer mode to the communication correspondent (i.e., the MFP 10), and receives an OK command from the MFP 10, the CPU 62 determines that the communication link of portable terminal (W)-correspondent (CE) has been established. In this case, the CPU 62 determines YES in S72, and proceeds to S74.

In S74, the CPU 62 sends a registration request and the identification information of the portable terminal 50 to the MFP 10 via the NFC I/F 58 by utilizing the communication link of portable terminal (W)-correspondent (CE). Upon ending S74, the CPU 62 ends the registration process of FIG. 4. In the present embodiment, if the registration process ends, the CPU 62 maintains the MFP application in the activated state.

(Function Performing Process Executed by Portable Terminal 50; FIG. 5)

Next, contents of a function performing process executed by the CPU 62 of the portable terminal 50 in accordance with the MFP application program will be described with reference to FIG. 5. Upon executing the function performing process of FIG. 5, also, the MFP application has already been installed in the memory 64 of the portable terminal 50. Upon activation of the MFP application and input of a function performing instruction (print instruction or scan instruction) in the operation unit 52, the CPU 62 starts the function performing process of FIG. 5. The CPU 62 executes the function performing process of FIG. 5 in accordance with the MFP application. In S90, the CPU 62 shifts the state of the portable terminal 50 to a state in which the Writer mode is ON, and other modes (the Reader mode, the P2P mode, and the CE mode) are not active.

Next, in S92, the CPU 62 monitors whether the communication link of portable terminal (W)-correspondent (CE) is established. If the CPU 62 sends the Activation command corresponding to the Writer mode to the communication correspondent (i.e., the MFP 10), and receives an OK command from the MFP 10, the CPU 62 determines that the communication link of portable terminal (W)-correspondent (CE) has been established. In this case, the CPU 62 determines YES in S92, and proceeds to S94.

In S94, the CPU 62 sends a performing request and the identification information of the portable terminal 50 to the MFP 10 via the NFC I/F 58 by utilizing the communication link of portable terminal (W)-correspondent (CE).

In S96, the CPU 62 stops the Writer mode, and activates the P2P mode. Specifically, in S96, the CPU 62 executes the following processes. First, the CPU 62 disconnects the communication link of portable terminal (W)-correspondent (CE). That is, the CPU 62 performs a communication of a Deactivation command and an OK command. Next, the CPU 62 stops the Writer mode, and activates the P2P mode. Consequently, the CPU 62 can change the state of the portable terminal 50 to the state in which the P2P mode is active, and the R/W mode and the CE mode are not active.

Next, in S98, the CPU 62 monitors whether a communication link of P2P is established. For example, if the portable terminal 50 is the Poll device, if the CPU 62 sends an Activation command corresponding to the P2P mode to the communication correspondent, and receives an OK command from the communication correspondent (i.e., the MFP 10), the CPU 62 determines that the communication link of P2P has been established. In this case, the CPU 62 determines YES in S98, and proceeds to S100. Further, e.g., if the portable terminal 50 is the Listen device, if the CPU 62 receives an Activation command corresponding to the P2P mode from the MFP 10, and sends an OK command to the communication correspondent, the CPU 62 determines that the communication link of P2P has been established. In this case, also, the CPU 62 determines YES in S98, and proceeds to S100. On the other hand, if the communication link of P2P is not established before a predetermined timeout period has elapsed, the CPU 62 determines NO in S98, and proceeds to S104. In S104, the CPU 62 causes the displaying unit 54 to display an error screen including a predetermined error message. When S104 ends, the function performing process of FIG. 5 ends the error. In this case, the CPU 62 ends the active MFP application. The CPU 62 returns the state of the portable terminal 50 to the initial state (the state in which the P2P mode and the Reader mode are active, and other modes are stopped).

In S100, the CPU 62 performs a two-way communication with the communication correspondent (the MFP 10) via the NFC I/F 58 by utilizing the communication link of P2P. Contents of the two-way communication performed in S100 are the same as the contents of the two-way communication performed in S28 of FIG. 2. Specifically, first, the CPU 62 sends network information to the MFP 10. That is, if the portable terminal 50 is belonging to a network (a normal Wi-Fi network or WFD network), the CPU 62 sends setting information (SSID, BSSID) indicating the wireless setting of the network to which the portable terminal 50 belongs. Moreover, if the portable terminal 50 is not belonging to a network, the CPU 62 sends information to the MFP 10 indicating that the portable terminal 50 is not belonging to a network. Here, the setting information indicating the wireless setting of the network to which the portable terminal 50 belongs, or the information indicating that the portable terminal 50 is not belonging to a network is equivalent to the "network information".

As described above, the MFP 10 sends the wireless setting or the no-change information to the portable terminal 50. The CPU 62 receives the wireless setting or the no-change information.

As a result of the two-way communication of S100, the portable terminal 50 and the MFP 10 become capable of utilizing a common wireless setting. By utilizing the common wireless setting, the CPU 62 establishes, with the MFP 10, a wireless communication link (WFD connection or normal Wi-Fi connection) utilizing the wireless LAN I/F 56. In case the wireless communication link utilizing the wireless LAN I/F 56 is established, the CPU 62 disconnects the communication link of P2P.

Next, in S102, the CPU 62 performs the specific function. Specifically, in S102, the CPU 62 communicates target data, which is the target of the function performed, with the MFP 10 via the wireless LAN I/F 56 by utilizing the established wireless communication link. For example, if the specific function indicated by the performing request sent in S94 is print, the CPU 62 sends print data (the target data) to the MFP 10. Upon receiving the target data, the MFP 10 causes the print executing unit 16 to print an image represented by the target data. Further, e.g., if the specific function is scan, the MFP 10 causes a document set on the MFP 10 to be scanned by the scan executing unit 18, creating scan data (the target data). The MFP 10 sends the created target data to the portable terminal 50.

Upon ending S102, the CPU 62 ends the function performing process of FIG. 5. In this case, the CPU 62 ends the active MFP application. The CPU 62 returns the state of the portable terminal 50 to the initial state (the state in which the P2P mode and the Reader mode are active, and other modes are stopped).

(Communication Upon Performing Installation; FIG. 6)

An example of a communication performed between the MFP 10 and the portable terminal 50 in case of performing installation of the MFP application will be described with reference to FIG. 6.

When the power of the MFP 10 is turned ON, the MFP 10 shifts to the initial state in which the CE mode is active, and other modes (the P2P mode and the R/W mode) are not active (S10 of FIG. 2). Next, the MFP 10 registers the application download URL in the NFC IF 22 (S12 of FIG. 2).

The MFP application has not been installed in the portable terminal 50. When the power of the portable terminal 50 is turned ON, the portable terminal 50 shifts to the initial state in which the Reader mode and the P2P mode are active, and other modes (the Writer mode and the CE mode) are not active. Next, the portable terminal 50 monitors whether the communication link of portable terminal (R)-correspondent (CE) is established.

In this state, by bringing the portable terminal 50 closer to the MFP 10, the portable terminal 50 approaches a distance in which the NFC I/Fs 22, 58 can communicate with one another (e.g., less than 10 cm). In this case, a communication link of MFP 10 (CE)-portable terminal 50 (R) is established between the MFP 10 and the portable terminal 50 via the NFC I/Fs 22, 58 (YES in S52 of FIG. 3).

Upon establishment of the communication link of MFP 10 (CE)-portable terminal 50 (R) between the MFP 10 and the portable terminal 50, the NFC IF 22 of the MFP 10 sends the application download URL registered in the NFC I/F 22 to the portable terminal 50 by utilizing the communication link of MFP 10 (CE)-portable terminal 50 (R). The portable terminal 50 receives the application download URL via the NFC I/F 58 (YES in S54 of FIG. 3).

The portable terminal 50 accesses a server indicated by the application download URL (a server provided by the vendor of the first OS) in accordance with the received application download URL, and downloads the MFP application (S56 of FIG. 3). Next, the portable terminal 50 installs the downloaded MFP application in the memory 64 (S56 of FIG. 3). When installation has been completed, the portable terminal 50 is capable of performing various processes in accordance with the MFP application.

(Identification Information Registration; FIG. 7)

Next, an example of a communication performed between the MFP 10 and the portable terminal 50 in case of performing registration of the identification information of the portable terminal 50 will be described with reference to FIG. 7.

When the power of the MFP 10 is turned ON, the MFP 10 shifts to the initial state in which the CE mode is active, and other modes (the P2P mode and the R/W mode) are not active (S10 of FIG. 2). Next, the MFP 10 registers the application download URL in the NFC I/F 22 (S12 of FIG. 2). Next, the MFP 10 monitors whether the communication link of MFP (CE)-correspondent (W) is established.

The MFP application has been installed in the portable terminal 50. When the registration instruction is input in the operation unit 52 after the MFP application has been activated, the portable terminal 50 shifts to a state in which the Writer mode is active, and other modes (the Reader mode, the P2P mode, and the CE mode) are not active (S70 of FIG. 4). Next, the portable terminal 50 monitors whether a communication link of portable terminal 50 (W)-correspondent (CE) is established (S72 of FIG. 4).

In this state, by bringing the portable terminal 50 closer to the MFP 10, the portable terminal 50 approaches a distance in which the NFC I/Fs 22, 58 can communicate with one another. In this case, a communication link of MFP 10 (CE)-portable terminal 50 (W) is established between the MFP 10 and the portable terminal 50 via the NFC I/Fs 22, 58 (YES in S14 of FIG. 2, YES in S72 of FIG. 4).

The portable terminal 50 sends a registration request and the identification information of the portable terminal 50 to the MFP 10 via the NFC I/C 58 by utilizing the communication link of MFP 10 (CE)-portable terminal 50 (W) (S74 of FIG. 4).

The MFP 10 receives the registration request and the identification information of the portable terminal 50 via the NFC I/F 22 (YES in S16 of FIG. 2). Upon receiving the registration request and the identification information of the portable terminal 50, the MFP 10 stores the received identification information of the portable terminal 50 in the memory 32. Upon ending the registration of the identification information, the MFP 10 again registers the application download URL in the NFC I/F 22.

(Performing of Function; FIG. 8)

Next, an example of a communication performed between the MFP 10 and the portable terminals 50, 80, in a case where the specific function of the MFP 10 is performed, will be described with reference to FIG. 8. In FIG. 8, an example is described in which the specific function of the MFP 10 is performed in a case where a communication is performed between the MFP 10 and the portable terminal 50, and the specific function of the MFP 10 is not performed in a case where a communication is performed between the MFP 10 and the portable terminal 80. Further, in FIG. 8, an example is described in which the identification information of the portable terminal 50 is being stored in the memory 32 of the MFP 10, whereas identification information of the portable terminal 80 is not being stored therein. Below, this is the same for examples of FIG. 11, FIG. 12, FIG. 13 (to be described).

When the power of the MFP 10 is turned ON, the MFP 10 shifts to the initial state in which the CE mode is active, and other modes (the P2P mode and the R/W mode) are not active (S10 of FIG. 2). Next, the MFP 10 registers the application download URL in the NFC I/F 22 (S12 of FIG. 2). Next, the MFP 10 monitors whether the communication link of MFP (CE)-correspondent (W) is established.

The MFP application has been installed in the portable terminal 50. Upon activation of the MFP application and the input of a function performing instruction (scan instruction, print instruction) to the operation unit 52, the portable terminal 50 shifts to a state in which the Writer mode is active, and other modes (the Reader mode, the P2P mode, and the CE mode) are not active (S90 of FIG. 4). Next, the portable terminal 50 monitors whether the communication link of portable terminal (W)-correspondent (CE) is established (S92 of FIG. 5).

In this state, by bringing the portable terminal 50 closer to the MFP 10, the portable terminal 50 approaches a distance in which the NFC I/Fs 22, 58 can communicate with one another, whereupon the communication link of MFP 10 (CE)-portable terminal 50 (W) is established between the MFP 10 and the portable terminal 50 via the NFC I/Fs 22, 58 (YES in S14 of FIG. 2, YES in S92 of FIG. 5).

The portable terminal 50 sends a performing request and the identification information of the portable terminal 50 to the MFP 10 via the NFC I/C 58 by utilizing the communication link of MFP 10 (CE)-portable terminal 50 (W) (S94 of FIG. 5). Next, the portable terminal 50 stops the Writer mode, and activates the P2P mode. In this case, the portable terminal 50 and the MFP 10 disconnect the communication link of MFP 10 (CE)-portable terminal 50 (W). The portable terminal 50 monitors whether a communication link of P2P is established.

The MFP 10 receives the performing request and the identification information of the portable terminal 50 via the NFC I/F 22 (YES in S18 of FIG. 2). Next, the MFP 10 determines whether identification has succeeded. If identification information identical to the received identification information is being stored in the memory 32, the MFP 10 determines that identification has succeeded (YES in S20 of FIG. 2). On the other hand, if identification information identical to the received identification information is not being stored within the memory 32, the MFP 10 determines that identification has failed (NO in S20 of FIG. 2). As described above, in the example of FIG. 8, the identification information of the portable terminal 50 is being stored in the memory 32 of the MFP 10. Consequently, the MFP 10 determines that identification has succeeded (YES in S20 of FIG. 2).

If it is determined that identification has succeeded (YES in S20 of FIG. 2), the MFP 10 determines whether the specific function indicated by the performing request is performable. For example, if the specific function is print, the MFP 10 verifies whether a device error such as paper jam, failure of the printing mechanism, etc., or a consumable items error such as out of toner (ink), out of paper etc., has occurred in the print executing unit 16. Consequently, if neither a device error nor a consumable items error has occurred in the print executing unit 16, the MFP 10 determines that the function is performable (YES in S22 of FIG. 2). On the other hand, if a device error or consumable items error has occurred in the print executing unit 16, the MFP 10 determines that the function is not performable (NO in S22 of FIG. 2). Similarly, e.g., if the specific function is scan, the MFP 10 verifies whether an error (e.g., document feed mechanism error, sensor error, etc.) has occurred in the scan executing unit 18. Consequently, if an error has not occurred in the scan executing unit 18, the MFP 10 determines that the function is performable (YES in S22 of FIG. 2). On the other hand, if an error has occurred in the scan executing unit 18, the MFP 10 determines that the function is not performable (NO in S22 of FIG. 2).

If it is determined that the function is performable (YES in S22 of FIG. 2), the MFP 10 stops the CE mode, and activates the P2P mode (S24 of FIG. 2). Next, the MFP 10 monitors whether a communication link of P2P is established.

In this state, upon being present within a distance in which the NFC I/Fs 22, 58 can communicate with one another, a communication link of P2P is established between the MFP 10 and the portable terminal 50 via the NFC I/Fs 22, 58 (YES in S26 of FIG. 2, YES in S98 of FIG. 5). Next, a P2P communication is performed between the MFP 10 and the portable terminal 50 by utilizing the communication link of P2P (S28 of FIG. 2, S100 of FIG. 5). That is, first, the portable terminal 50 sends, to the MFP 10, network information (the wireless setting of the network to which the portable terminal 50 belongs, or information indicating that the portable terminal 50 is not belonging to a network). Next, the MFP 10 sends, to the portable terminal 50, the wireless setting of the WFD network in which the MFP 10 is G/O, or the no-change information.

As a result of the P2P communication, the MFP 10 and the portable terminal 50 become capable of utilizing a common wireless setting. By utilizing the common wireless setting, the MFP 10 and the portable terminal 50 establish a wireless communication link (WFD connection or normal Wi-Fi connection) which utilizes the wireless LAN I/Fs 20, 56.

Next, the MFP 10 stops the P2P mode, and activates the CE mode (S30 of FIG. 2). In this case, the MFP 10 and the portable terminal 50 disconnect the communication link of P2P. Next, the MFP 10 and the portable terminal 50 communicate the target data, created by performing the specific function indicated by the performing request, via the wireless LAN I/Fs 20, 56 by utilizing the established wireless communication link (S32 of FIG. 2, S102 of FIG. 5). For example, if the specific function is print, the portable terminal 50 sends print data (the target data) to the MFP 10. Upon receiving the target data, the MFP 10 causes the print executing unit 16 to print an image represented by the target data. Further, if the specific function is scan, the MFP 10 scans a document set on the document feed mechanism of the scan executing unit 18, creating scan data (the target data). The MFP 10 sends the created target data to the portable terminal 50.

When the performing of the function ends, the MFP 10 again registers the application download URL in the NFC I/F 22. On the other hands, the portable terminal 50 ends the active MFP application. In this case, the portable terminal 50 returns to the initial state (the state in which the P2P mode and the Reader mode are active, and other modes are stopped).

On the other hand, if it is determined that identification has failed (NO in S20 of FIG. 2), or if it is determined that the function is not performable (NO in S22 of FIG. 2), the MFP 10 causes the displaying unit 14 to display an error screen (S36 of FIG. 2). Then, the MFP 10 again registers the application download URL in the NFC I/F 22.

As described above, in the example of FIG. 8, the identification information of the portable terminal 80 is not being stored in the memory 32 of the MFP 10. Consequently, the MFP 10 determines that identification has failed (NO in S20 of FIG. 2). In this case, the communication link of P2P is not established between the portable terminal 80 and the MFP 10. Consequently, when the predetermined timeout period has elapsed, the portable terminal 80 causes an error screen to be displayed on the displaying unit (S104 of FIG. 5). Next, the portable terminal 80 ends the active MFP application. The portable terminal 80 returns to the initial state.

Effects of Present Embodiment

As was described with reference to FIG. 8, the MFP 10 receives the performing request and the identification information of the portable terminal 50 from the portable terminal 50 by utilizing the communication link of MFP 10 (CE)-portable terminal 50 (W) (YES in S18 of FIG. 2). Further, in case of receiving the performing request and the identification information of the portable terminal 50, the MFP 10 determines whether identification has succeeded, and whether the specific function is performable (S20 and S22 of FIG. 2). If identification succeeded (YES in S20 of FIG. 2), and the specific function indicated by the performing request is performable (YES in S22 of FIG. 2), the MFP 10 establishes the communication link of P2P between the MFP 10 and the portable terminal 50 via the NFC I/F 22 (YES in S26 of FIG. 2). The MFP 10 performs a two-way communication (P2P communication) by utilizing the communication link of P2P which was established (S28 of FIG. 2, FIG. 8). On the other hand, in case it is determined that identification has failed (NO in S20 of FIG. 2), or in case it is determined that the function is not performable (NO in S22 of FIG. 2), the MFP 10 does not perform a two-way communication (P2P communication) with the portable terminal 80 (see FIG. 8). That is, the MFP 10 of the present embodiment can change whether to perform a two-way communication with the portable terminal 50 by utilizing the communication link of P2P in accordance with whether identification has succeeded and whether the specific function is performable. Consequently, according to the MFP 10 of the present embodiment, a communication which utilizes the NFC I/F 22, and a communication which utilizes the wireless LAN I/F 20 is performable appropriately.

In the present embodiment, in case identification succeeded (YES in S20 of FIG. 2), and the specific function indicated by the performing request is performable (YES in S20 and YES in S22 of FIG. 2), the MFP 10 establishes the communication link of P2P with the portable terminal 50 (see FIG. 8). Consequently, the MFP 10 can appropriately establish the communication link of P2P. Further, in the present embodiment, in case it is determined that identification has failed (NO in S20 of FIG. 2), or in case it is determined that the function is not performable (NO in S22 of FIG. 2), the MFP 10 does not establish the communication link of P2P with the portable terminal 80 (see FIG. 8). The MFP 10 can change whether to establish the communication link of P2P in accordance with the determination result. Consequently, the MFP 10 can appropriately establish the communication link of P2P.

As described above, in the present embodiment, in case identification succeeded (YES in S20 of FIG. 2), and the specific function indicated by the performing request is performable (YES in S22 of FIG. 2), the MFP 10 can perform the two-way communication (the P2P communication of S28 of FIG. 2) of information for performing the specific function. That is, in the present embodiment, the MFP 10 performs the two-way communication of information for performing the specific function (S28 of FIG. 2) with the portable terminal 50 which has identification information registered beforehand in the memory 32 of the MFP 10, and does not perform the two-way communication of information for performing the specific function with the portable terminal 80 which does not have identification information registered in the memory 32 of the MFP 10. Consequently, the MFP 10 can allow the function to be performed only by the user of the portable terminal 50 which underwent registration of the identification information. Further, the MFP 10 can allow the function to be performed only in the case where the state of the MFP 10 is a state capable of performing the specific function. That is, the MFP 10 of the present embodiment can appropriately determine whether a function is performable between the MFP 10 and the portable terminals 50, 80.

(Corresponding Relationships)

The MFP 10 and the portable terminals 50, 80 are respectively examples of the "communication device" and the "terminal device". The NFC I/Fs 22, 58, and the wireless LAN I/Fs 20, 56 are respectively examples of the "first type of interface" and the "second type of interface". The CE mode and the Writer mode are respectively examples of the "first mode" and the "second mode". The communication link of MFP 10 (CE)-portable terminal 50 (80) (W) is an example of the "first communication link". The communication link of P2P between the MFP 10 and the portable terminal 50 is an example of the "second communication link". The performing request and the identification information of the portable terminal 50 is an example of the "first information". The identification information of the portable terminal 50 is an example of the "specific identification information". The network information of the portable terminal 50, and the wireless setting or the no-change information sent by the MFP 10 is an example of the "second information". The determination of S20, and the determination of S22 of FIG. 2 are respectively examples of the "first determining process" and the "second determining process".

S18 of FIG. 2 is an example of "receiving". S26 of FIG. 2 is an example of "establishing". S20 of FIG. 2 is an example of "execute a first determining process". S22 of FIG. 2 is an example of "execute a second determining process". S28 of FIG. 2 is an example of "performing". S36 of FIG. 2 is an example of a process performed in the case of "not performing". S34 of FIG. 2 is an example of "storing".

Second Embodiment

The second embodiment will be described focusing on points different from the first embodiment. In the present embodiment, the contents of a communication process executed by the CPU 30 of the MFP 10 are different from the first embodiment (see FIG. 9). Further, in the present embodiment, contents of a function performing process executed by the CPU 62 of the portable terminal 50 are also different from the first embodiment (see FIG. 10).

(Communication Process Executed by CPU 30 of MFP 10; FIG. 9)

Contents of a communication process executed by the CPU 30 of the MFP 10 in accordance with a program will be described with reference to FIG. 9. When the power of the MFP 10 is turned ON, the CPU 30 starts the communication process of FIG. 9. In S120, the CPU 30 shifts the state of the MFP 10 to the initial state in which the CE mode is active, and other modes (the P2P mode and the R/W mode) are not active.

Next, in S122, the CPU 30 registers the application download URL in the NFC I/F 22. Next, in S124, the CPU 30 monitors whether a MFP 10 (CE)-correspondent (W) communication link is established. When the communication link of MFP (CE)-correspondent (W) is established, the CPU 30 determines YES in S124, and proceeds to S126 and S128.

In S126, the CPU 30 monitors whether a registration request and identification information are received from the communication correspondent via the NFC I/F 22 by utilizing the communication link of MFP (CE)-correspondent (W). In case of YES in S126, processing proceeds to S154. Contents of processes of S126, S154, and of processes after the end of S154, are the same as contents of processes of S16, S34 of FIG. 2, and of processes after the end of S34, and consequently a detailed description is omitted.

In S128, the CPU 30 monitors whether a Reader activation command is received from the communication correspondent via the NFC I/F 22 by utilizing the communication link of MFP (CE)-correspondent (W). The Reader activation command is a command for requesting activation of the Reader mode of the MFP 10. If the CPU 30 receives a Reader activation command from the communication correspondent which is operating in the Writer mode, the CPU 30 determines YES in S128, and proceeds to S130.

In S130, the CPU 30 stops the CE mode, and activates the Reader mode. Specifically, in S130, the CPU 30 disconnects the communication link of MFP (CE)-correspondent (W), then stops the CE mode, and activates the Reader mode.

In S132, the CPU 30 monitors whether a communication link of MFP (R)-correspondent (CE) is established. When the communication link of MFP (R)-correspondent (CE) is established, the CPU 30 determines YES in S132, and proceeds to S134.

In S134, the CPU 30 monitors whether a performing request and identification information are received from the communication correspondent via the NFC I/F 22 by utilizing the communication link of MFP (R)-correspondent (CE). If the CPU 30 receives, from the communication correspondent which is operating in the CE mode, the performing request and the identification information of the communication correspondent, the CPU 30 determines YES in S134, and proceeds to S136.

In S136, the CPU 30 determines whether identification has succeeded. The process of S136 is the same as the process of S20 of FIG. 2. In case of YES in S136, processing proceeds to S138. On the other hand, in case of NO in S136, processing proceeds to S156.

In S138, the CPU 30 determines whether the MFP 10 is capable of performing the specific function indicated by the performing request. The process of S138 is the same as the process of S22 of FIG. 2. In case of YES in S138, processing proceeds to S140. On the other hand, in case of NO in S138, processing proceeds to S156.

In S156, as in S36 of FIG. 2, the CPU 30 causes the displaying unit 14 to display the predetermined error screen. Upon ending S156, the CPU 30 returns to S120, activates the CE mode, turns OFF the Reader mode, and again executes the processes from S122 onwards.

In S140, the CPU 30 stops the Reader mode, and activates the Writer mode. Specifically, in S140, the CPU 30 disconnects a communication link of MFP 10 (R)-correspondent (CE), then stops the Reader mode, and activates the Writer mode.

In S142, the CPU 30 monitors whether a communication link of MFP (W)-correspondent (CE) is established. If the communication link of MFP (W)-correspondent (CE) is established, the CPU 30 determines YES in S142, and proceeds to S144.

In S144, the CPU 30 sends a P2P activation command to the communication correspondent via the NFC I/F 22 by utilizing the communication link of MFP (W)-correspondent (CE). The P2P activation command is a command to the communication correspondent for requesting activation of the P2P mode.

Next, in S145, the CPU 30 stops the Writer mode, and activates the P2P mode. Specifically, in S145, the CPU 30 disconnects the communication link of MFP (W)-correspondent (CE), then stops the Writer mode, and activates the P2P mode.

Next, in S146, the CPU 30 monitors whether a communication link of P2P is established. The process of S146 is the same as the process of S26 of FIG. 2. If the communication link of P2P is established, the CPU 30 determines YES in S146, and proceeds to S148.

The processes S148, S150, S152 are the same as the processes S28, S30, S32 of FIG. 2. Further, the contents of the processes after S152 are also the same as the contents of the processes after S32 of FIG. 2. Consequently, in the present embodiment a detailed description is omitted.

(Function Performing Process Executed by Portable Terminal 50; FIG. 10)

Next, contents of a function performing process executed by the CPU 62 of the portable terminal 50 in accordance with the MFP application program will be described with reference to FIG. 10. After activation of the MFP application, when a function performing instruction (print instruction or scan instruction) is input to the operation unit 52, the CPU 62 starts the function performing process of FIG. 10. That is, in the present embodiment, also, the CPU 62 performs the function performing process of FIG. 10 in accordance with the MFP application. In S170, the CPU 62 shifts the state of the portable terminal 50 to a state in which the Writer mode is active, and other modes (the Reader mode, the P2P mode, and the CE mode) are not active.

Next, in S172, the CPU 62 monitors whether a communication link of portable terminal (W)-correspondent (CE) is established. The process of S172 is the same as S92 of FIG. 5. In case of YES in S172, processing proceeds to S174.

In S174, the CPU 62 sends a Reader activation command to the communication correspondent (i.e., the MFP 10) via the NFC I/F 58 by utilizing the communication link of portable terminal (W)-correspondent (CE).

Next, in S176, the CPU 62 stops the Writer mode, and activates the CE mode. Specifically, in S176, the CPU 62 first disconnects the communication link of portable terminal 50 (W)-correspondent (CE), then stops the Writer mode, and activates the CE mode. Consequently, the CPU 62 can change the state of the MFP 10 to a state in which the CE mode is active, and the R/W mode and the P2P mode are not active.

Next, in S177, the CPU 62 registers the performing request and the identification information of the portable terminal 50 in the NFC I/F 58.

In S178, the CPU 62 monitors whether a communication link of portable terminal (CE)-correspondent (R) is established. If the communication link of portable terminal (CE)-correspondent (R) is established, the CPU 62 determines YES in S178, and proceeds to S182.

Moreover, if the communication link of portable terminal (CE)-correspondent (R) is established (YES in S178), the NFC I/F 58 automatically sends the registered performing request and the identification information of the portable terminal 50 to the communication correspondent (the MFP 10) which is operating in the Reader mode.

In S182, the CPU 62 monitors whether a communication link of portable terminal (CE)-correspondent (W) is established. If the communication link of portable terminal (CE)-correspondent (W) is established, the CPU 62 determines YES in S182, and proceeds to S184.

In S184, the CPU 62 monitors whether a P2P activation command is received via the NFC I/F 58 by utilizing the communication link of portable terminal (CE)-correspondent (W). If the P2P activation command is received from the communication correspondent, which is operating in the Writer mode, the CPU 62 determines YES in S184, and proceeds to S186. On the other hand, if the P2P activation command is not received before a predetermined timeout period has elapsed, the CPU 62 determines NO in S184, and proceeds to S196.

In S186, the CPU 62 stops the CE mode, and activates the P2P mode. Specifically, in S186, the CPU 62 disconnects the communication link of portable terminal (CE)-correspondent (W), then stops the CE mode, and activates the P2P mode.

In S188, the CPU 62 monitors whether a communication link of P2P is established. The process of S188 is the same as the process of S98 of FIG. 5. In case of YES in S188, processing proceeds to S190. On the other hand, if a communication link of P2P is not established before a predetermined timeout period has elapsed, the CPU 62 determines NO in S188, and proceeds to S196.

In S196, the CPU 62 causes the displaying unit 54 to display a predetermined error screen. Upon ending S196, the error of the function performing process of FIG. 10 ends. In this case, the CPU 62 ends the active MFP application. The CPU 62 returns the state of the portable terminal 50 to the initial state (the state in which the P2P mode and the Reader mode are active, and other modes are stopped).

The processes S190, S192 are the same as the processes of S100, S102 of FIG. 5. Consequently, a detailed description is omitted. Upon ending S192, the function performing process of FIG. 10 ends. In this case, the CPU 62 ends the active MFP application. The CPU 62 returns the state of the portable terminal 50 to the initial state (the state in which the P2P mode and the Reader mode are active, and other modes are stopped).

(Performing of Function; FIG. 11)

Next, an example of a communication performed between the MFP 10 and the portable terminals 50, 80 in a case where the specific function of the MFP 10 is performed will be described with reference to FIG. 11.

When the power of the MFP 10 is turned ON, the MFP 10 shifts to the initial state in which the CE mode is active, and other modes (the P2P mode and the R/W mode) are not active (S120 of FIG. 9). Next, the MFP 10 registers the application download URL in the NFC I/F 22 (S122 of FIG. 9). Next, the MFP 10 monitors whether a communication link of MFP (CE)-correspondent (W) is established.

The MFP application has been installed in the portable terminal 50. After the MFP application has been activated, if a function performing instruction (scan instruction, print instruction) is input to the operation unit 52, the portable terminal 50 shifts to a state in which the Writer mode is active, and other modes (the Reader mode, the P2P mode, and the CE mode) are not active (S170 of FIG. 10). Next, the portable terminal 50 monitors whether the communication link of portable terminal (W)-correspondent (CE) is established (S172 of FIG. 10).

In this state, by bringing the portable terminal 50 closer to the MFP 10, the portable terminal 50 approaches a distance in which the NFC I/Fs 22, 58 can communicate with one another. In this case, the communication link of MFP 10 (CE)-portable terminal 50 (W) is established between the MFP 10 and the portable terminal 50 via the NFC I/Fs 22, 58, (YES in S124 of FIG. 9, YES in S172 of FIG. 10).

The portable terminal 50 sends a Reader activation command to the MFP 10 via the NFC I/C 58 by utilizing the communication link of MFP 10 (CE)-portable terminal 50 (W) (S174 of FIG. 10). Next, the portable terminal 50 stops the Writer mode, and activates the CE mode (S176 of FIG. 10). In this case, the portable terminal 50 and the MFP 10 disconnect the communication link of MFP 10 (CE)-portable terminal 50 (W). The portable terminal 50 registers the identification information of the portable terminal 50 and the performing request in the NFC I/F 58 (S177 of FIG. 10). Next, the portable terminal 50 monitors whether a communication link of MFP 10 (R)-portable terminal 50 (CE) is established.

The MFP 10 receives the Reader activation command via the NFC I/F 22 (YES in S128 of FIG. 9). Next, the MFP 10 disconnects the communication link of MFP 10 (CE)-portable terminal 50 (W). The MFP 10 stops the CE mode, and activates the Reader mode (S130 of FIG. 9). Next, the MFP 10 monitors whether the communication link of MFP 10 (R)-portable terminal 50 (CE) is established (S132 of FIG. 9).

In this state, upon being present within a distance in which the NFC I/Fs 22, 58 can communicate with one another, the communication link of MFP 10 (R)-portable terminal 50 (CE) is established between the MFP 10 and the portable terminal 50 via the NFC I/Fs 22, 58 (YES in S132 of FIG. 9, YES in S178 of FIG. 10).

The NFC I/F 58 sends a performing request and the identification information of the portable terminal 50 to the MFP 10 by utilizing the communication link of MFP 10 (R)-portable terminal 50 (CE). Next, the portable terminal 50 monitors whether a communication link of MFP 10 (W)-portable terminal 50 (CE) is established.

The MFP 10 receives the performing request and the identification information of the portable terminal 50 via the NFC I/F 22 (YES in S134 of FIG. 9). Next, the MFP 10 determines whether identification has succeeded (S136 of FIG. 9). In the example of FIG. 11, also, the identification information of the portable terminal 50 is being stored in the memory 32 of the MFP 10. Consequently, the MFP 10 determines that identification has succeeded (YES in S136 of FIG. 9).

Upon determining that identification has succeeded (YES in S136 of FIG. 9), the MFP 10 determines whether the specific function indicated by the received performing request is performable (S138 of FIG. 9). If it is determined that the function is performable (YES in S138 of FIG. 9), the MFP 10 disconnects the communication link of MFP 10 (R)-portable terminal 50 (CE). Next, the MFP 10 stops the Reader mode, and activates the Writer mode (S140 of FIG. 9). Next, the MFP 10 monitors whether a communication link of MFP 10 (W)-portable terminal 50 (CE) is established.

In this state, upon being present within a distance in which the NFC I/Fs 22, 58 can communicate with one another, the communication link of MFP 10 (W)-portable terminal 50 (CE) is established between the MFP 10 and the portable terminal 50 via the NFC I/Fs 22, 58 (YES in S142 of FIG. 9, YES in S182 of FIG. 10).

The MFP 10 sends the P2P activation command to the communication correspondent via the NFC I/F 22 by utilizing the communication link of MFP 10 (W)-portable terminal 50 (CE) (S144 of FIG. 9). The portable terminal 50 receives the P2P activation command via the NFC I/F 58 (YES in S184 of FIG. 10).

Next, the MFP 10 disconnects the communication link of MFP 10 (W)-portable terminal 50 (CE). Next, the MFP 10 stops the Writer mode, and activates the P2P mode (S145 of FIG. 9). The MFP 10 monitors whether a communication link of P2P is established (S146 of FIG. 9).

On the other hand, upon receiving the P2P activation command, the portable terminal 50 stops the CE mode, and activates the P2P mode (S186 of FIG. 10). Next, the portable terminal 50 monitors whether a communication link of P2P is established (S188 of FIG. 10).

In this state, upon being present within a distance in which the NFC I/Fs 22, 58 can communicate with one another, a communication link of P2P is established between the MFP 10 and the portable terminal 50 via the NFC I/Fs 22, 58 (YES in S146 of FIG. 9, YES in S188 of FIG. 10). Next, a P2P communication is performed between the MFP 10 and the portable terminal 50 by utilizing the communication link of P2P (S148 of FIG. 9, S190 of FIG. 10).

As a result of the P2P communication, the MFP 10 and the portable terminal 50 become capable of utilizing a common wireless setting. By utilizing the common wireless setting, the MFP 10 and the portable terminal 50 establish a wireless communication link (WFD connection or normal Wi-Fi connection) utilizing the wireless LAN I/Fs 20, 56.

Next, the MFP 10 stops the P2P mode, and activates the CE mode (S150 of FIG. 9). The MFP 10 and the portable terminal 50 disconnect the communication link of P2P. Next, the MFP 10 and the portable terminal 50 communicate the target data, created by performing the specific function indicated by the performing request, via the wireless LAN I/Fs 20, 56 by utilizing the wireless communication link that was established (S152 of FIG. 9, S192 of FIG. 10).

When the performing of the function ends, the MFP 10 again registers the application download URL in the NFC I/F 22. On the other hand, the portable terminal 50 ends the active MFP application. In this case, the portable terminal 50 returns to the initial state (the state in which the P2P mode and the Reader mode are active, and other modes are stopped).

On the other hand, if it is determined that identification has failed (NO in S136 of FIG. 9), or if it is determined that the function is not performable (NO in S138 of FIG. 9), the MFP 10 causes the displaying unit 14 to display an error screen (S156 of FIG. 9). Then, the MFP 10 again activates the CE mode, turns OFF the Reader mode, and again registers the application download URL in the NFC I/F 22 (S120, S122 of FIG. 9).

In the example of FIG. 11, also, the identification information of the portable terminal 80 is not being stored in the memory 32 of the MFP 10. Consequently, the MFP 10 determines that identification has failed (NO in S136 of FIG. 9). In this case, a communication link of MFP 10 (W)-portable terminal 80 (CE) is not established between the portable terminal 80 and the MFP 10. Consequently, when the predetermined timeout period has elapsed, the portable terminal 80 causes the displaying unit 54 to display an error screen (S196 of FIG. 10). Next, the portable terminal 80 ends the active MFP application. The portable terminal 80 returns to the initial state.

Effects of Present Embodiment

The MFP 10 of the present embodiment also displays the same effects as the first embodiment. That is, the MFP 10 allows a communication which utilizes the NFC I/F 22 and a communication which utilizes the wireless LAN I/F 20 to be performed appropriately.

(Corresponding Relationships)

The Reader mode and the CE mode are respectively examples of the "first mode" and the "second mode". The communication link of MFP 10 (R)-portable terminal 50 (80) (CE) is an example of the "first communication link".

Third Embodiment

The third embodiment will be described focusing on points different from the second embodiment. The present embodiment differs from the second embodiment in the point that the MFP 10 can simultaneously activate the Reader mode and the CE mode. In the present embodiment, in the initial state of the MFP 10, the Reader mode and the CE mode are active, and other modes (the P2P mode and the Writer mode) are not active. Consequently, in the present embodiment, in a case where a function of the MFP 10 is performed, the contents of a communication performed between the MFP 10 and the portable terminals 50, 80 are also different from the second embodiment.

Figure 12:
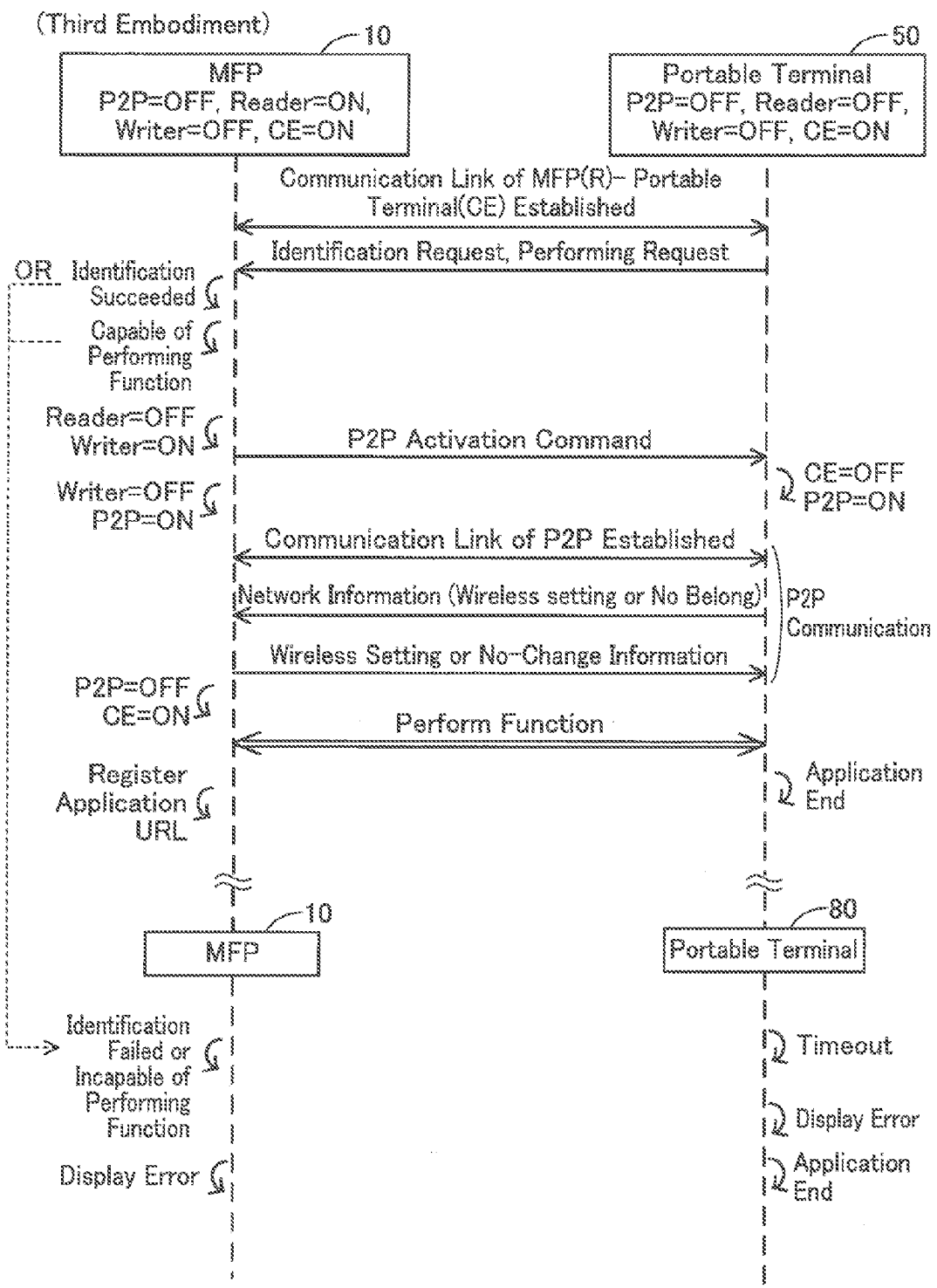
FIG. 12 shows a sequence chart of a communication when a function of a third embodiment is performed.

(Performing of Function; FIG. 12)

An example of a communication performed between the MFP 10 and the portable terminals 50, 80 in a case where a function of the MFP 10 is performed will be described with reference to FIG. 12.

In the present embodiment, when the power of the MFP 10 is turned ON, the MFP 10 shifts to the initial state in which the CE mode and the Reader mode are active, and other modes (the P2P mode and the Writer mode) are not active. Next, the MFP 10 monitors whether a communication link of MFP (R)-correspondent (CE) is established.

Upon the activation of the MFP application and the input of a function performing instruction (scan instruction, print instruction) to the operation unit 52, the portable terminal 50 shifts to a state in which the CE mode is active, and other modes (the P2P mode and the R/W mode) are not active. Next, the portable terminal 50 monitors whether a communication link of portable terminal (CE)-correspondent (R) is established.

In this state, when the portable terminal 50 is brought closer to the MFP 10, the communication link of MFP 10 (R)-portable terminal 50 (CE) is established between the MFP 10 and the portable terminal 50 via the NFC I/Fs 22, 58.

The NFC I/F 58 sends a performing request and the identification information of the portable terminal 50 to the MFP 10 by utilizing the communication link of MFP 10 (R)-portable terminal 50 (CE). Next, the portable terminal 50 monitors whether a communication link of MFP 10 (W)-portable terminal 50 (CE) is established.

The MFP 10 receives the performing request and the identification information of the portable terminal 50 via the NFC I/F 22. Next, the MFP 10 determines whether identification has succeeded. In the example of FIG. 12, also, the identification information of the portable terminal 50 is being stored in the memory 32 of the MFP 10. Consequently, the MFP 10 determines that identification has succeeded. In case it is determined that identification has succeeded, then the MFP 10 determines whether the specific function indicated by the received performing request is performable. If it is determined that the function is performable, the MFP 10 stops the Reader mode, and activates the Writer mode.

Communication performed subsequently between the MFP 10 and the portable terminal 50 is the same as in the second embodiment (see FIG. 11), and consequently a detailed description is omitted in the present embodiment.

On the other hand, if it is determined that identification has failed, or if it is determined that the function is not performable, the MFP 10 causes the displaying unit 14 to display an error screen.

In the example of FIG. 12, also, the identification information of the portable terminal 80 is not being stored in the memory 32 of the MFP 10. Consequently, the MFP 10 determines that identification has failed. In this case, the communication link of MFP 10 (W)-portable terminal 80 (CE) is not established between the portable terminal 80 and the MFP 10. Consequently, when the predetermined timeout period has elapsed, the portable terminal 80 causes the displaying unit 54 to display an error screen. Next, the portable terminal 80 ends the active MFP application. The portable terminal 80 returns to the initial state.

(Corresponding Relationships)

In the present embodiment, also, the Reader mode and the CE mode are respectively examples of the "first mode" and the "second mode". Further, the communication link of MFP 10 (R)-portable terminal 50 (80) (CE) is an example of the "first communication link".

Fourth Embodiment

The fourth embodiment will be described focusing on points different from the first embodiment. The present embodiment differs from the first embodiment in the point that, as shown in FIG. 13, the communication link of P2P is established between the MFP 10 and the portable terminal 50 before performing the determination of whether identification has succeeded.

(Performing of Function; FIG. 13)

An example of a communication performed between the MFP 10 and the portable terminals 50, 80 in a case where a function of the MFP 10 is performed will be described with reference to FIG. 13.

In the present embodiment, also, processes are the same as the first embodiment until the communication link of MFP 10 (CE)-portable terminal 50 (W) is established between the MFP 10 and the portable terminal 50 via the NFC I/Fs 22, 58 (see FIG. 8).

In the present embodiment, the portable terminal 50 sends only the performing request to the MFP 10 via the NFC I/C 58 by utilizing the communication link of MFP 10 (CE)-portable terminal 50 (W). Next, the portable terminal 50 stops the Writer mode, and activates the P2P mode. In this case, the portable terminal 50 and the MFP 10 disconnect the communication link of MFP 10 (CE)-portable terminal 50 (W). The portable terminal 50 monitors whether the communication link of P2P is established.

The MFP 10 receives the performing request via the NFC IF 22. Next, the MFP 10 determines whether the specific function indicated by the received performing request is performable.

If it is determined that the function is performable, the MFP 10 stops the CE mode, and activates the P2P mode. Next, the MFP 10 monitors whether a communication link of P2P is established.

In this state, upon being present within a distance in which the NFC I/Fs 22, 58 can communicate with one another, the communication link of P2P is established between the MFP 10 and the portable terminal 50 via the NFC I/Fs 22, 58.

Moreover, although not shown in FIG. 13, if it is determined that the function is not performable, the MFP 10 does not activate the P2P mode. Consequently, the communication link of P2P is not established between the MFP 10 and the portable terminal 50. In this case, as in the case in the first embodiment where it was determined that the function is not performable, after the MFP 10 has caused the displaying unit 14 to display an error screen, the MFP 10 again registers the application download URL in the NFC I/F 22. The portable terminal 50 also performs a predetermined error display after a predetermined timeout period has elapsed. Then, the portable terminal 50 ends the MFP application, and returns to the initial state. According to the configuration of the present embodiment, the MFP 10 can appropriately establish the communication link of P2P.

Upon establishment of the communication link of P2P, the portable terminal 50 sends the identification information of the portable terminal 50 to the MFP 10 via the NFC I/F 58 by utilizing the communication link of P2P.

The MFP 10 receives the identification information of the portable terminal 50 via the NFC I/F 22. Next, the MFP 10 determines whether identification has succeeded. If it is determined that identification has succeeded, the MFP 10 sends success information indicating that identification succeeded to the portable terminal 50 via the NFC IF 22 by utilizing the communication link of P2P.

Upon receiving the success information, the portable terminal 50 sends network information (the wireless setting of the network to which the portable terminal 50 belongs, or information indicating that the portable terminal 50 is not belonging to a network) to the MFP 10. Next, the MFP 10 sends, to the portable terminal 50, the wireless setting of the WFD network in which the MFP 10 is G/O, or the no-change information.

As a result, the MFP 10 and the portable terminal 50 become capable of utilizing a common wireless setting. By utilizing the common wireless setting, the MFP 10 and the portable terminal 50 establish a wireless communication link (WFD connection or normal Wi-Fi connection) utilizing the wireless LAN I/Fs 20, 56. Since subsequent communications are the same as those of the first embodiment, a detailed description is omitted. According to this configuration, in case of establishing the communication link of P2P with the portable terminal 50 before the determination of whether identification has succeeded is performed, the MFP 10 can appropriately determine whether the communication between the MFP 10 and the portable terminal 50 utilizing the wireless LAN I/F 20 is performable.

On the other hand, if it is determined that identification has failed, the MFP 10 sends error information indicating that identification has failed to the communication correspondent (the portable terminal 80) via the NFC I/F 22 by utilizing the communication link of P2P. Next, the MFP 10 causes the displaying unit 14 to display an error screen. Then, the MFP 10 activates the CE mode, turns OFF the Reader mode, and again registers the application download URL in the NFC I/F 22.

In the example of FIG. 13, also, the identification information of the portable terminal 80 is not being stored in the memory 32 of the MFP 10. Consequently, the MFP 10 determines that identification has failed. Upon receiving error information, the portable terminal 80 causes a displaying unit to display a predetermined error screen. Next, the portable terminal 80 ends the active MFP application. The portable terminal 80 returns to the initial state.

Effects of Present Embodiment

As described above, the MFP 10 of the present embodiment establishes a communication link of P2P with the portable terminal 50 (80) before performing the determination of whether identification has succeeded. If it is determined that identification has succeeded, the MFP 10 performs a two-way communication of network information, and wireless setting or the no-change information by utilizing the established communication link of P2P. On the other hand, if it is determined that identification has failed, the MFP 10 sends the error information to the portable terminal 80 by utilizing the established communication link of P2P. Consequently, the MFP 10 of the present embodiment can appropriately establish the communication link of P2P. Consequently, by utilizing the communication link of P2P, the MFP 10 can appropriately perform the two-way communication of network information, and the wireless setting or the no-change information, or the sending of the error information.

(Corresponding Relationships)

The error information is an example of the "third information". The determination of whether identification has succeeded, and the determination of whether the function is performable are respectively examples of the "first determining process" and the "second determining process".

Specific examples of the present invention are described above in detail, but these examples are merely illustrative and place no limitation on the scope of the patent claims. The technology described in the patent claims also encompasses various changes and modifications to the specific examples described above. Variants to the above embodiments are listed below.

(Variant 1)

The CPU 30 of the MFP 10 may perform only the determination of whether identification has succeeded (S20 of FIG. 2, S136 of FIG. 9). That is, the CPU 30 may omit the determination of whether the specific function indicated by the performing request is performable (S22 of FIG. 2, S138 of FIG. 9). In this variant, the determination of whether identification has succeeded is an example of the "first determining process".

(Variant 2)

Conversely, the CPU 30 of the MFP 10 may perform only the determination of whether the specific function is performable (S22 of FIG. 2, S138 of FIG. 9). That is, the CPU 30 may omit the determination of whether identification has succeeded (S20 of FIG. 2, S136 of FIG. 9). In this variant, the determination of whether the specific function is performable is an example of the "first determining process".

(Variant 3)

In the first to third embodiments, in the case of determining that identification has failed (NO in S20 of FIG. 2, NO in S136 of FIG. 9), or in the case of determining that the function is not performable (NO in S22 of FIG. 2, NO in S138 of FIG. 9), the CPU 30 of the MFP 10 may activate the P2P mode, and establish a communication link of P2P with a portable terminal (e.g., the portable terminal 80). In this case, by utilizing the communication link of P2P that has been established, the MFP 10 may send, to the portable terminal 80, error information indicating that identification has failed or that the function is not performable. That is, in general terms, a controller of a communication device may execute establishing a second communication link between the communication device and a terminal device via a first type of interface in a case where first information is received from the terminal device. The second communication link may be any communication link in which the communication device operates in the P2P mode, and the terminal device operates in the P2P mode and is to perform data communication.

(Variant 4)

The "communication device" is not restricted to a multifunction peripheral capable of performing the print function and the scan function (i.e., the MFP 10), but may be a printer that is capable of performing only the print function from among the print function and the scan function, or may be a scanner that is capable of performing only the scan function from among the print function and the scan function. Further, the "communication device" may be a device that performs a function different from the print function and the scan function (e.g., an image display function, a data calculation function) (e.g., PC, server, portable terminal (portable telephone, Smart Phone, PDA, etc.)). That is, the "communication device" includes any device capable of performing a communication of the NFC scheme and a wireless LAN communication. Further, the "terminal device" is not restricted to the portable terminals 50, 80, but includes any device capable of performing a communication of the NFC scheme and a wireless LAN communication.

(Variant 5)

In the above embodiments, the processes of FIG. 2 to FIG. 5, FIG. 9, and FIG. 10 are realized by software (i.e., a program), but at least one of the processes of FIG. 2 to FIG. 5, FIG. 9, and FIG. 10 may be realized by hardware such as a logic circuit, etc.

What is claimed is:

1. A communication device comprising:
a first type of interface configured to perform a communication with a terminal device according to an NFC (abbreviation of Near Field Communication) scheme complying with an NFC standard;
a second type of interface configured to perform a communication with the terminal device according to a scheme different from the NFC scheme; and
a controller configured to:
receive first information from the terminal device by using a first communication link in a case where the first communication link is established via the first type of interface between the communication device and the terminal device, the first communication link being a communication link in which a data communication is to be performed by the communication device operating in a first mode of the NFC standard that is different from a P2P (abbreviation of Peer to Peer) mode of the NFC standard and by the terminal device operating in a second mode of the NFC standard that is different from the P2P mode and the first mode;
in a case where the first information is received from the terminal device, execute a first determining process related to whether a communication via the second type of interface between the communication device and the terminal device is performable;
establish a second communication link via the first type of interface between the communication device and the terminal device in the case where the first information is received from the terminal device, the second communication link being a communication link in which a data communication is to be performed by the communication device operating in the P2P mode and by the terminal device operating in the P2P mode; and
perform a two-way communication of second information with the terminal device by using the second communication link, in a case where it is determined in the first determining process that the communication via the second type of interface between the communication device and the terminal device is performable, the second information being information for performing a communication via the second type of interface between the communication device and the terminal device,
wherein the controller is configured not to perform the two-way communication of the second information with the terminal device, in a case where it is determined in the first determining process that the communication via the second type of interface between the communication device and the terminal device is not performable.

2. The communication device as in claim 1, wherein the controller is configured to establish the second communication link in the case where it is determined in the first determining process that the communication via the second type of interface between the communication device and the terminal device is performable.

3. The communication device as in claim 2, wherein the controller is configured not to establish the second communication link in the case where it is determined in the first determining process that the communication via the second type of interface between the communication device and the terminal device is not performable.

4. The communication device as in claim 1, wherein
the controller is further configured to store specific identification information for identifying the terminal device in a memory in a case where an instruction for registering the specific identification information is given,
the first information includes the specific identification information, and
the first determining process includes:
determining that the communication via the second type of interface between the communication device and the terminal device is performable, in a case where the first information including the specific identification information is received from the terminal device in a state where the specific identification information is stored in the memory; and
determining that the communication via the second type of interface between the communication device and the terminal device is not performable, in a case where the first information including the specific identification information is received from the terminal device in a state where the specific identification information is not stored in the memory.

5. The communication device as in claim 4, wherein
the controller is configured to further execute a second determining process related to whether a communication via the second type of interface between the communication device and the terminal device is performable, in a case where the first information is received from the terminal device,
the first information includes a performing request for causing the communication device to perform a specific function,
the second determining process includes:
determining that the communication via the second type of interface between the communication device and the terminal device is performable, in a case where the communication device is in a state being capable of performing the specific function; and
determining that the communication via the second type of interface between the communication device and the terminal device is not performable, in a case where the communication device is in a state being incapable of performing the specific function,
the controller is configured to perform the two-way communication of the second information with the terminal device by using the second communication link, in a case where it is determined in both of the first determining process and the second determining process that the communication via the second type of interface between the communication device and the terminal device is performable, and
the controller is configured not to perform the two-way communication of the second information with the terminal device, in a case where it is determined in at least one of the first determining process and the second determining process that the communication via the second type of interface between the communication device and the terminal device is not performable.

6. The communication device as in claim 1, wherein
the first information includes a performing request for causing the communication device to perform a specific function,
the first determining process includes:
determining that the communication via the second type of interface between the communication device and the terminal device is performable, in a case where the communication device is in a state being capable of performing the specific function; and
determining that the communication via the second type of interface between the communication device and the terminal device is not performable, in a case where the communication device is in a state being incapable of performing the specific function.

7. The communication device as in claim 1, wherein
the controller is configured to establish the second communication link before executing the first determining process,
the controller is configured to perform the two-way communication of the second information with the terminal device by using the established second communication link, in the case where it is determined in the first determining process that the communication via the second type of interface between the communication device and the terminal device is performable; and
the controller is further configured to send third information different from the second information to the terminal device by using the established second communication link, in the case where it is determined in the first determining process that the communication via the second type of interface between the communication device and the terminal device is not performable, the third information indicating that the communication via the second type of interface between the communication device and the terminal device is not performable.

8. The communication device as in claim 7, wherein
the controller is further configured to store specific identification information for identifying the terminal device in a memory, in a case where an instruction for registering the specific identification information is given,
the first determining process includes:
determining that the communication via the second type of interface between the communication device and the terminal device is performable, in a case where the specific identification information is received by using the second communication link in a state where the specific identification information is stored in the memory; and
determining that the communication via the second type of interface between the communication device and the terminal device is not performable, in a case where the specific identification information is received by using the second communication link in a state where the specific identification information is not stored in the memory.

9. The communication device as in claim 8, wherein
the controller is further configured to execute a second determining process related to whether the communication via the second type of interface between the communication device and the terminal device is performable,
the first information includes a performing request for causing the communication device to perform a specific function,
the second determining process includes:
determining that the communication via the second type of interface between the communication device and the terminal device is performable, in a case where the communication device is in a state being capable of performing the specific function; and
determining that the communication via the second type of interface between the communication device and the terminal device is not performable, in a case where the communication device is in a state being incapable of performing the specific function, the controller is configured to establish the second communication link, in a case where it is determined in the second determining process that the communication via the second type of interface between the communication device and the terminal device is performable, and the controller is configured not to establish the second communication link, in a case where it is determined in the second determining process that the communication via the second type of interface between the communication device and the terminal device is not performable.

10. The communication device as in claim 1, wherein
the first mode is a CE (abbreviation of Card Emulation) mode of the NFC standard, and
the second mode is a Writer mode of the NFC standard.

11. The communication device as in claim 1, wherein
the first mode is a Reader mode of the NFC standard, and
the second mode is a CE (abbreviation of Card Emulation) mode of the NFC standard.

12. The communication device as in claim 1, wherein
a communication speed of the communication via the second type of interface is faster than a communication speed of the communication via the first type of interface.

13. The communication device as in claim 1, wherein
the controller is further configured to perform the communication via the second type of interface between the communication device and the terminal device by using the second information after performing the two-way communication of the second information with the terminal device.

14. A non-transitory computer-readable medium storing computer-executable instructions for a communication device, wherein the computer-executable instructions, when executed by a controller of the communication device, cause the communication device to:

receive first information from a terminal device by using a first communication link in a case where the first communication link is established via a first type of interface of the communication device between the communication device and the terminal device, the first type of interface configured to perform communications according to a Near Field Communication (NFC) scheme complying with an NFC standard, the first communication link being a communication link in which a data communication is to be performed by the communication device operating in a first mode of the NFC standard that is different from a P2P (abbreviation of Peer to Peer) mode of the NFC standard and by the terminal device operating in a second mode of the NFC standard that is different from the P2P mode and the first mode;

in a case where the first information is received from the terminal device, execute a first determining process related to whether a communication via a second type of interface of the communication device between the communication device and the terminal device is performable, the second type of interface configured to perform communications with the terminal device according to a scheme different from the NFC scheme;

establish a second communication link via the first type of interface between the communication device and the terminal device in the case where the first information is received from the terminal device, the second communication link being a communication link in which a data communication is to be performed by the communication device operating in the P2P mode and by the terminal device operating in the P2P mode; and perform a two-way communication of second information with the terminal device by using the second communication link, in a case where it is determined in the first determining process that the communication via the second type of interface between the communication device and the terminal device is performable, the second information being information for performing a communication via the second type of interface between the communication device and the terminal device, wherein the computer-executable instructions cause the communication device not to perform the two-way communication of the second information with the terminal device, in a case where it is determined in the first determining process that the communication via the second type of interface between the communication device and the terminal device is not performable.

15. A non-transitory computer-readable medium storing computer-executable instructions for a terminal device, wherein the computer-executable instructions, when executed by a controller of the terminal device, cause the terminal device to:

send first information to a communication device by using a first communication link in a case where the first communication link is established via a first type of interface of the terminal device between the communication device and the terminal device, the first type of interface configured to perform communications with the communication device according to a Near Field Communication (NFC) scheme complying with an NFC standard, the first communication link being a communication link in which a data communication is to be performed by the communication device operating in a first mode of the NFC standard that is different from a Peer-to-Peer (P2P) mode of the NFC standard and by the terminal device operating in a second mode of the NFC standard that is different from the P2P mode and the first mode;

establish a second communication link via the first type of interface between the terminal device and the communication device in a case where the first information is sent to the communication device, the second communication link being a communication link in which a data communication is to be performed by the communication device operating in the P2P mode and by the terminal device operating in the P2P mode; and perform a two-way communication of second information with the communication device, in a case where the communication device determines that the communication via a second type of interface of the terminal device between the terminal device and the communication device is performable, as a result of the first information being sent to the communication device, the second information being information for performing a communication via the second type of interface between the communication device and the terminal device, the second type of interface configured to perform communications with the communication device according to a scheme different from the NFC scheme, wherein the computer-executable instructions cause the terminal device not to perform the two-way communication of the second information with the communication device, in a case where the communication device determines that the communication via the second type of interface between the terminal device and the communication device is not performable, as a result of the first information being sent to the communication device.

* * * * *